US009225006B2

(12) United States Patent
Fujiki et al.

(10) Patent No.: US 9,225,006 B2
(45) Date of Patent: Dec. 29, 2015

(54) ELECTRODE, SECONDARY BATTERY, BATTERY PACK, ELECTRIC VEHICLE, ELECTRIC POWER STORAGE SYSTEM, ELECTRIC POWER TOOL, AND ELECTRONIC APPARATUS

(71) Applicant: Sony Corporation, Tokyo (JP)

(72) Inventors: Satoshi Fujiki, Fukushima (JP); Hideki Nakai, Fukushima (JP); Yosuke Hosoya, Fukushima (JP)

(73) Assignee: SONY CORPORATION, Tokyo (JP)

( * ) Notice: Subject to any disclaimer, the term of this patent is extended or adjusted under 35 U.S.C. 154(b) by 235 days.

(21) Appl. No.: 13/682,401

(22) Filed: Nov. 20, 2012

(65) Prior Publication Data

US 2013/0136985 A1    May 30, 2013

(30) Foreign Application Priority Data

Nov. 25, 2011  (JP) ................. 2011-257436

(51) Int. Cl.

| | |
|---|---|
| *H01M 4/131* | (2010.01) |
| *H01M 4/136* | (2010.01) |
| *H01M 4/505* | (2010.01) |
| *H01M 4/525* | (2010.01) |
| *H01M 4/58* | (2010.01) |
| H01M 4/36 | (2006.01) |
| *H01M 4/485* | (2010.01) |
| *H01M 10/052* | (2010.01) |

(52) U.S. Cl.
CPC .............. *H01M 4/131* (2013.01); *H01M 4/136* (2013.01); *H01M 4/366* (2013.01); *H01M 4/505* (2013.01); *H01M 4/525* (2013.01); *H01M 4/5825* (2013.01); *H01M 4/362* (2013.01); *H01M 4/364* (2013.01); *H01M 4/485* (2013.01); *H01M 10/052* (2013.01); *Y02E 60/122* (2013.01); *Y02T 10/7011* (2013.01)

(58) Field of Classification Search
CPC ....................................................... H01M 4/131
See application file for complete search history.

(56) References Cited

U.S. PATENT DOCUMENTS

| | | | | |
|---|---|---|---|---|
| 2007/0111105 | A1* | 5/2007 | Zaghib et al. ................. | 429/322 |
| 2009/0081554 | A1* | 3/2009 | Takada et al. ................. | 429/322 |
| 2009/0202903 | A1* | 8/2009 | Chiang et al. ................. | 429/203 |
| 2010/0190058 | A1* | 7/2010 | Thackeray et al. ........... | 429/223 |
| 2011/0070365 | A1* | 3/2011 | Kawaoka ....................... | 427/180 |
| 2011/0084702 | A1* | 4/2011 | Mori .............................. | 324/430 |

(Continued)

FOREIGN PATENT DOCUMENTS

| | | |
|---|---|---|
| JP | 05-036411 | 2/1993 |
| JP | 10-241681 | 9/1998 |
| JP | 2855877 | 2/1999 |

(Continued)

*Primary Examiner* — Jeremiah Smith
(74) *Attorney, Agent, or Firm* — Hazuki International, LLC

(57) ABSTRACT

A secondary battery includes: a cathode; an anode; and an electrolytic solution. The cathode includes a lithium composite oxide, a first compound, and a second compound. The lithium composite oxide includes lithium (Li) and a transition metal element as constituent elements. The first compound includes a first metal element different from the transition metal element as a constituent element, the first compound existing on a surface and inside of the lithium composite oxide. The second compound includes a second metal element different from the first metal element as a constituent element, the second compound existing on the surface of the lithium composite oxide.

16 Claims, 7 Drawing Sheets

(56) References Cited

U.S. PATENT DOCUMENTS

2011/0267006 A1* 11/2011 Tanno .................... 320/116
2012/0273737 A1* 11/2012 Ooishi ................. 252/520.21

FOREIGN PATENT DOCUMENTS

| | | | | |
|---|---|---|---|---|
| JP | 3054829 | 6/2000 | | |
| JP | 2002-358963 | 12/2002 | | |
| JP | 2006-066330 | 3/2006 | | |
| JP | 2007-214090 | 8/2007 | | |
| JP | 2008-311132 | 12/2008 | | |
| JP | 4307962 | 8/2009 | | |
| WO | WO2011/043296 | * 4/2011 | ............ | H01M 4/525 |

* cited by examiner

ELECTRODE, SECONDARY BATTERY, BATTERY PACK, ELECTRIC VEHICLE, ELECTRIC POWER STORAGE SYSTEM, ELECTRIC POWER TOOL, AND ELECTRONIC APPARATUS

CROSS REFERENCES TO RELATED APPLICATIONS

The present application claims priority to Japanese Priority Patent Application JP 2011-257436 filed in the Japan Patent Office on Nov. 25, 2011, the entire content of which is hereby incorporated by reference.

BACKGROUND

The present application relates to an electrode that includes a lithium composite oxide, to a secondary battery that uses the electrode, to a battery pack, an electric vehicle, an electric power storage system, an electric power tool, and to an electronic apparatus that use the secondary battery.

In recent years, various electronic apparatuses such as a mobile phone and a personal digital assistant (PDA) have been widely used, and it has been strongly demanded to further reduce the size and the weight of the electronic apparatuses and to achieve their long life. Accordingly, as an electric power source for the electronic apparatuses, a battery, in particular, a small and light-weight secondary battery capable of providing high energy density has been developed. In these days, it has been considered to apply such a secondary battery to various other applications represented by a battery pack attachably and detachably mounted on the electronic apparatuses or the like, an electric vehicle such as an electric automobile, an electric power storage system such as a home electric power server, or an electric power tool such as an electric drill.

As the secondary battery, secondary batteries that obtain a battery capacity by utilizing various charge and discharge principles have been proposed. Specially, a secondary battery utilizing insertion and extraction of lithium ions or the like as an electrode reactant is considered promising, since such a secondary battery provides higher energy density than lead batteries, nickel cadmium batteries, and the like.

The secondary battery includes a cathode, an anode, and an electrolytic solution. The cathode has a cathode active material layer on a cathode current collector. The cathode active material layer contains a cathode active material contributing to a charge and discharge reaction. As the cathode active material, generally, a lithium composite oxide such as $LiCoO_2$, $LiNiO_2$, and $LiMn_2O_4$, or a lithium phosphate compound such as $LiFePO_4$ is used.

A composition of the cathode active material largely affects performance of the secondary battery. Therefore, various studies have been made on the composition of the cathode active material. Specifically, to obtain superior charge and discharge characteristics and the like, Zr is added to $Li_{1-x}CoO_2$ ($0 \leq x < 1$) (for example, see Japanese Patent No. 0285877). To improve cycle characteristics under a high voltage, $Li_xCo_{1-y-z}Zr_yMe_zO_{2-a}$ (Me represents elements such as a metal element with atomic number of 11 or more other than Co and Zr, $1 < x < 1.2$, $0 < y \leq 0.01$, $0 \leq z < 0.1$, and $-0.1 \leq a \leq 0.1$) containing Zr as a constituent element is used (for example, see Japanese Unexamined Patent Application Publication No. 2002-358963). To suppress performance deterioration at the time of storing a battery, an oxide of a heterogeneous element such as Zr is mixed in a lithium transition metal composite oxide such as lithium manganate (for example, see Japanese Unexamined Patent Application Publication No. 2006-066330). To obtain a high charge and discharge capacity even if the charge final voltage is equal to or higher than 4.3 V, a compound containing Zr is sintered in a state of particles on the surface of $LiCoO_2$ (for example, see Japanese Patent No. 4307962). To obtain superior load characteristics and superior cycle characteristics, $LiCoO_2$ particle powder is covered with a Zr compound to localize a zirconium compound on the surface of the $LiCoO_2$ particle powder (for example, see Japanese Unexamined Patent Application Publication No. 2008-311132). To obtain superior charge and discharge characteristics and superior large current charge and discharge characteristics, P is added to one or more selected from the group consisting of $LiMn_2O_4$, $LiCoO_2$ and $LiNiO_2$ (for example, see Japanese Unexamined Patent Application Publication No. H05-036411). To retain a high operating voltage and obtain superior charge and discharge characteristics, a lithium compound, a cobalt compound, and phosphoric acid are mixed, heat treatment is subsequently performed on the mixture in an oxidant atmosphere, and particle surfaces of the resultant Li—Co composite oxide are covered with P (for example, see Japanese Patent No. 3054829). To improve cycle characteristics under high temperature, a mixture of $Li_xMO_2$ (M represents at least Mn, and $0.01 \leq x \leq 1.5$) and a phosphorous compound is used (for example, see Japanese Unexamined Patent Application Publication No. H10-241681). To improve cycle characteristics, low temperature heavy load characteristics, and safety, a zirconium-containing lithium-cobalt composite oxide and $Li_xCo_{1-y}A_yO_2$ (A represents Mg or the like, $0.05 \leq x \leq 1.15$, and $0 \leq y \leq 0.03$) are mixed in $Li_tCoM_sO_2$ (M represents Fe or the like, $0 \leq s \leq 0.03$, and $0.05 \leq t \leq 1.15$) (for example, see Japanese Unexamined Patent Application Publication No. 2007-214090).

SUMMARY

In recent years, high performance and multi-functions of the electronic apparatuses and the like to which the secondary battery is applied are increasingly developed. Therefore, further improvement of the battery characteristics of the secondary battery has been desired.

It is desirable to provide an electrode capable of providing superior battery characteristics, a secondary battery, a battery pack, an electric vehicle, an electric power storage system, an electric power tool, and an electronic apparatus.

According to an embodiment of the present application, there is provided an electrode including: a lithium composite oxide; a first compound; and a second compound. The lithium composite oxide includes lithium (Li) and a transition metal element as constituent elements. The first compound includes a first metal element different from the transition metal element as a constituent element, the first compound existing on a surface and inside of the lithium composite oxide. The second compound includes a second metal element different from the first metal element as a constituent element, the second compound existing on the surface of the lithium composite oxide.

According to an embodiment of the present application, there is provided a secondary battery including: a cathode; an anode; and an electrolytic solution. The cathode includes a lithium composite oxide, a first compound, and a second compound. The lithium composite oxide includes lithium (Li) and a transition metal element as constituent elements. The first compound includes a first metal element different from the transition metal element as a constituent element, the first compound existing on a surface and inside of the lithium composite oxide. The second compound includes a second metal element different from the first metal element as a constituent element, the second compound existing on the surface of the lithium composite oxide.

According to an embodiment of the present application, there is provided a battery pack including: a secondary battery; a control section controlling a usage state of the secondary battery; and a switch section switching the usage state of the secondary battery according to an instruction of the control section. The secondary battery includes a cathode, an anode, and an electrolytic solution. The cathode includes a lithium composite oxide, a first compound, and a second compound. The lithium composite oxide includes lithium (Li) and a transition metal element as constituent elements. The first compound includes a first metal element different from the transition metal element as a constituent element, the first compound existing on a surface and inside of the lithium composite oxide. The second compound includes a second metal element different from the first metal element as a constituent element, the second compound existing on the surface of the lithium composite oxide.

According to an embodiment of the present application, there is provided an electric vehicle including: a secondary battery; a conversion section converting electric power supplied from the secondary battery to drive power; a drive section operating according to the drive power; and a control section controlling a usage state of the secondary battery. The secondary battery includes a cathode, an anode, and an electrolytic solution. The cathode includes a lithium composite oxide, a first compound, and a second compound. The lithium composite oxide includes lithium (Li) and a transition metal element as constituent elements. The first compound includes a first metal element different from the transition metal element as a constituent element, the first compound existing on a surface and inside of the lithium composite oxide. The second compound includes a second metal element different from the first metal element as a constituent element, the second compound existing on the surface of the lithium composite oxide.

According to an embodiment of the present application, there is provided an electric power storage system including: a secondary battery; one, or two or more electric devices supplied with electric power from the secondary battery; and a control section controlling the supplying of the electric power from the secondary battery to the electric device. The secondary battery includes a cathode, an anode, and an electrolytic solution. The cathode includes a lithium composite oxide, a first compound, and a second compound. The lithium composite oxide includes lithium (Li) and a transition metal element as constituent elements. The first compound includes a first metal element different from the transition metal element as a constituent element, the first compound existing on a surface and inside of the lithium composite oxide. The second compound includes a second metal element different from the first metal element as a constituent element, the second compound existing on the surface of the lithium composite oxide.

According to an embodiment of the present application, there is provided an electric power tool including: a secondary battery; and a movable section being supplied with electric power from the secondary battery. The secondary battery includes a cathode, an anode, and an electrolytic solution. The cathode includes a lithium composite oxide, a first compound, and a second compound. The lithium composite oxide includes lithium (Li) and a transition metal element as constituent elements. The first compound includes a first metal element different from the transition metal element as a constituent element, the first compound existing on a surface and inside of the lithium composite oxide. The second compound includes a second metal element different from the first metal element as a constituent element, the second compound existing on the surface of the lithium composite oxide.

According to an embodiment of the present application, there is provided an electronic apparatus with a secondary battery as an electric power supply source, the secondary battery including: a cathode; an anode; and an electrolytic solution. The cathode includes a lithium composite oxide, a first compound, and a second compound. The lithium composite oxide includes lithium (Li) and a transition metal element as constituent elements. The first compound includes a first metal element different from the transition metal element as a constituent element, the first compound existing on a surface and inside of the lithium composite oxide. The second compound includes a second metal element different from the first metal element as a constituent element, the second compound existing on the surface of the lithium composite oxide.

According to the electrode and the secondary battery according to the embodiments of the present application, the lithium composite oxide, the first compound, and the second compound are included; the first compound exists on the surface and inside of the lithium composite oxide; and the second compound exists on the surface of the lithium composite oxide. Therefore, superior battery characteristics are obtainable. Further, according to the battery pack, the electric vehicle, the electric power storage system, the electric power tool, and the electronic apparatus according to the embodiments of the present application, similar effects are obtainable.

It is to be understood that both the foregoing general description and the following detailed description are exemplary, and are intended to provide further explanation of the technology as claimed.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Embodiments of the present application will be hereinafter described in detail with reference to the drawings. The description will be given in the following order.
1. Electrode and Secondary Battery
   1-1. Lithium Ion Secondary Battery (Cylindrical Type)
   1-2. Lithium Ion Secondary Battery (Laminated Film Type)
2. Applications of Secondary Battery
   2-1. Battery Pack
   2-2. Electric Vehicle
   2-3. Electric Power Storage System
   2-4. Electric Power Tool

[1. Electrode and Secondary Battery]
[1-1. Lithium Ion Secondary Battery (Cylindrical Type)]

Figure 1:
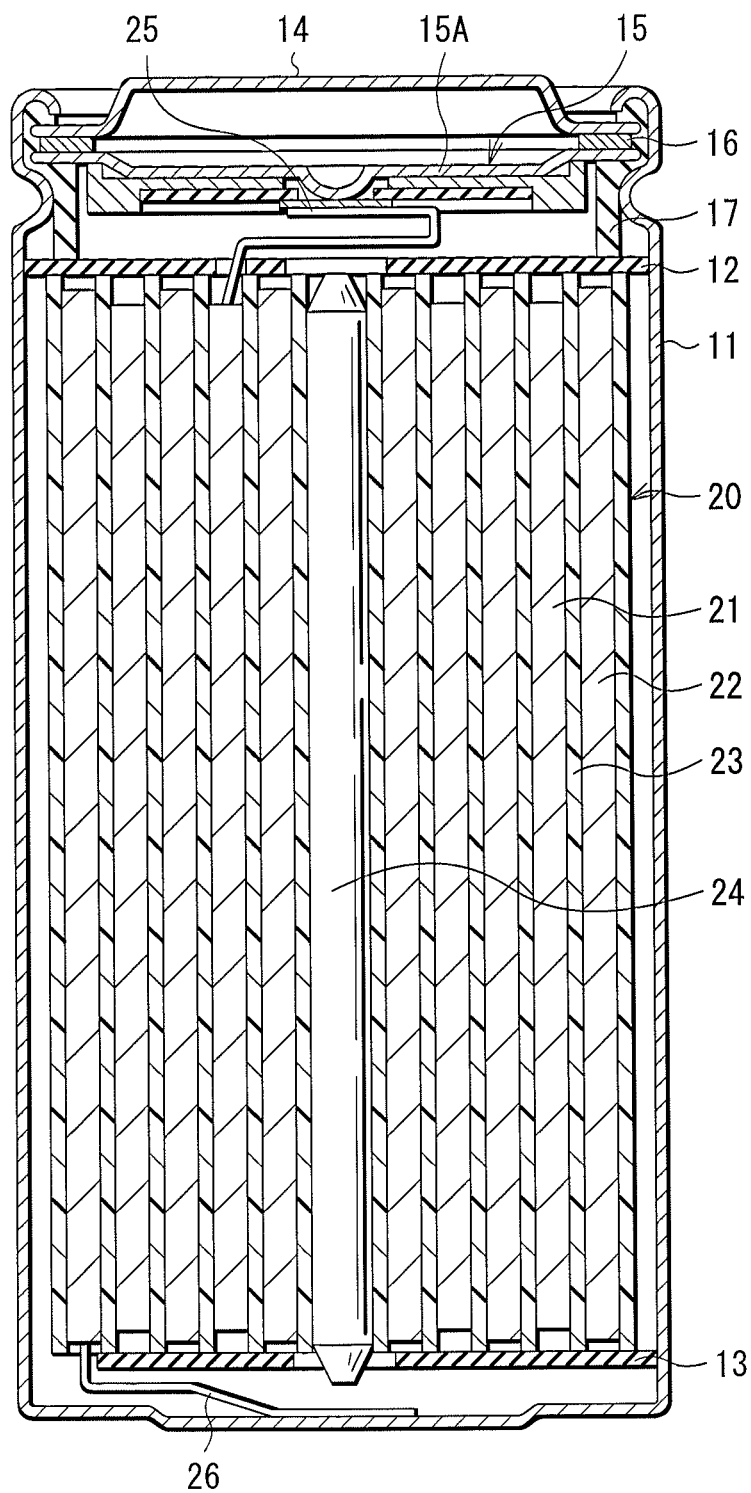
FIG. 1 is a cross-sectional view illustrating a configuration of a secondary battery (cylindrical type) including an electrode according to an embodiment of the present application.
Figure 2:
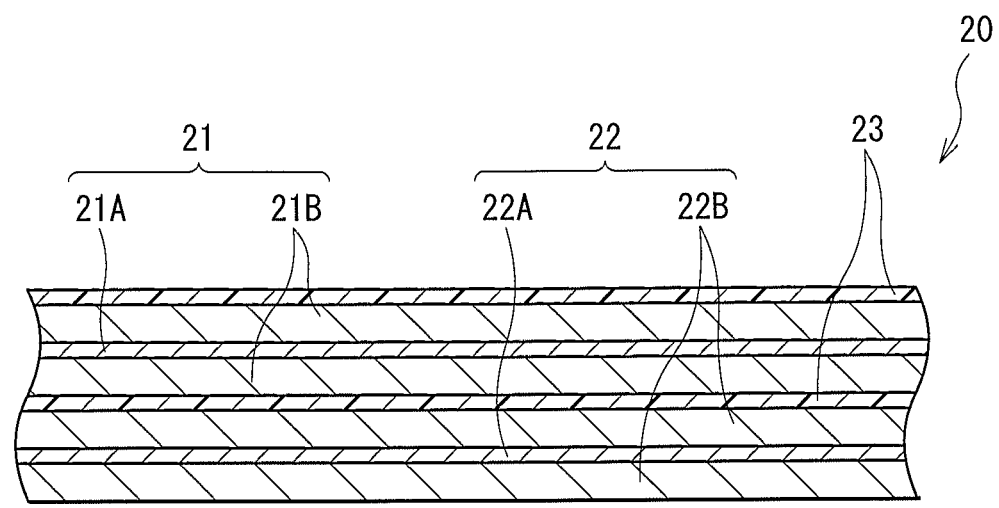
FIG. 2 is a cross-sectional view illustrating an enlarged part of a spirally wound electrode body illustrated in FIG. 1.

FIG. 1 and FIG. 2 illustrate cross-sectional configurations of a secondary battery using an electrode according to an embodiment of the present application. FIG. 2 illustrates an enlarged part of a spirally wound electrode body 20 illustrated in FIG. 1. In this case, for example, the foregoing electrode is used as a cathode 21.

[Whole Configuration of Secondary Battery]

The secondary battery is a lithium ion secondary battery (hereinafter simply referred to as "secondary battery") in which the capacity of an anode 22 is obtainable by insertion and extraction of lithium (lithium ions) as an electrode reactant. In this case, for example, the foregoing electrode according to the embodiment of the present application is used as the cathode 21.

The secondary battery herein described is, for example, what we call a cylindrical type secondary battery. The secondary battery contains the spirally wound electrode body 20 and a pair of insulating plates 12 and 13 inside a battery can 11 in the shape of a substantially hollow cylinder. In the spirally wound electrode body 20, for example, the cathode 21 and the anode 22 are layered with a separator 23 in between and are spirally wound.

The battery can 11 has a hollow structure in which one end of the battery can 11 is closed and the other end of the battery can 11 is opened. The battery can 11 may be made of, for example, Fe, Al, an alloy thereof, or the like. The surface of the battery can 11 may be plated with a metal material such as Ni. The pair of insulating plates 12 and 13 is arranged to sandwich the spirally wound electrode body 20 in between, and to extend perpendicularly to the spirally wound periphery surface.

At the open end of the battery can 11, a battery cover 14, a safety valve mechanism 15, and a positive temperature coefficient device (PTC device) 16 are attached by being swaged with a gasket 17. Thereby, the battery can 11 is hermetically sealed. The battery cover 14 may be made of, for example, a material similar to that of the battery can 11. The safety valve mechanism 15 and the PTC device 16 are provided inside the battery cover 14. The safety valve mechanism 15 is electrically connected to the battery cover 14 through the PTC device 16. In the safety valve mechanism 15, in the case where the internal pressure becomes a certain level or more by internal short circuit, external heating, or the like, a disk plate 15A inverts to cut electric connection between the battery cover 14 and the spirally wound electrode body 20. The PTC device 16 prevents abnormal heat generation resulting from a large current. In the PTC device 16, as temperature rises, its resistance is increased accordingly. The gasket 17 may be made of, for example, an insulating material. The surface of the gasket 17 may be coated with asphalt.

In the center of the spirally wound electrode body 20, a center pin 24 may be inserted. For example, a cathode lead 25 made of a conductive material such as Al is connected to the cathode 21. For example, an anode lead 26 made of a conductive material such as Ni is connected to the anode 22. The cathode lead 25 is, for example, welded to the safety valve mechanism 15, and is electrically connected to the battery cover 14. The anode lead 26 is, for example, welded to the battery can 11, and is electrically connected to the battery can 11.

[Cathode]

In the cathode 21, for example, a cathode active material layer 21B is provided on a cathode current collector 21A (a single surface thereof or both surfaces thereof). The cathode current collector 21A may be made of, for example, a conductive material such as Al, Ni, and stainless steel.

The cathode active material layer 21B contains, as cathode active materials, one, or two or more of cathode materials capable of inserting and extracting lithium ions. As necessary, the cathode active material layer 21B may contain other material such as a cathode binder and a cathode electric conductor.

The cathode material contains a lithium composite oxide. The lithium composite oxide contains lithium (Li) and one, or two or more transition metal elements as constituent elements, since thereby high energy density is obtainable. Specially, the lithium composite oxide preferably contains one or more of nickel (Ni), cobalt (Co), and manganese (Mn) as transition metal elements, and more preferably contains Co, since thereby energy density is further increased, and accordingly a high battery capacity is obtained.

In particular, the cathode material contains specific two types of compounds (a first compound and a second compound) together with the lithium composite oxide. Specifically, the first compound exists on the surface of the lithium composite oxide (surface of particles) and inside thereof (inside of the particles). The first compound contains, as constituent elements, one, or two or more of first metal elements different from the transition metal elements of the lithium composite oxide. Specially, the first compound preferably contains zirconium (Zr) or titanium (Ti) or both as the first metal element. Meanwhile, the second compound does not exist inside of the lithium composite oxide, and exists only on the surface thereof. The second compound contains, as constituent elements, one, or two or more of second metal elements different from the first metal elements of the first compound. Specially, the second compound preferably contains one or more of sodium (Na), lithium (Li), magnesium (Mg), zinc (Zn), manganese (Mn), and barium (Ba) as the second metal elements. However, atoms of the first metal element and atoms of the second metal element are not constituent atoms of a crystal lattice of the lithium composite oxide. In other words, differently from an atom of Li and an atom of the transition metal element, the atoms of the first metal element and the atoms of the second metal element do not form the crystal lattice of the lithium composite oxide. Therefore, the first compound and the second compound exist separately from the crystal structure of the lithium composite oxide.

The cathode material contains the first compound and the second compound together with the lithium composite oxide. One reason for this is that, at the time of charge, the cathode active material is electrochemically stabilized, and a decomposition reaction of the electrolytic solution due to reactivity of the cathode active material is suppressed.

More specifically, inside the secondary battery in a state of being charged, the cathode 21 has strong oxidizing characteristics. Therefore, the electrolytic solution tends to be easily decomposed (oxidative decomposition) due to reactivity of the cathode 21. Such a tendency is particularly significant under a high-temperature environment. If a decomposition reaction of the electrolytic solution occurs, an inactive coat is formed on the surface of the cathode active material. Therefore, electron conductivity, ion conductivity, and/or the like is inhibited. Further, a decomposed matter of the electrolytic solution causes a highly-active material (molecule) in the electrolytic solution with which the cathode 21 is impregnated. Therefore, deterioration of the electrolytic solution is accelerated, and the cathode active material is dissolved. Thereby, the battery capacity is decreased. In addition thereto, in the case where charge and discharge are repeated, the discharge capacity is easily lowered.

Meanwhile, in the case where the first compound exists not only on the surface of the lithium composite oxide, but also inside thereof, the cathode active material is electrochemically stabilized at the time of charge. In addition thereto, in the case where the second compound exists on the surface of the lithium composite oxide in contact with the electrolytic solution, and the second compound contains the second metal element (such as Na) as a constituent element, a decomposition reaction of the electrolytic solution due to reactivity of the cathode active material is suppressed. Therefore, due to synergetic action between the first compound and the second compound, both electrochemical stability of the cathode active material and decomposition suppression of the electrolytic solution are achieved. Accordingly, a high battery capacity is obtained, and the discharge capacity is less likely to be lowered even if charge and discharge are repeated.

The words, "the first compound exists on the surface of the lithium composite oxide and inside thereof, and the second compound exists on the surface of the lithium composite oxide" refer to a difference in existence state (distribution) between the first compound and the second compound with respect to the lithium composite oxide.

More specifically, the cathode material containing the first compound and the second compound together with the lithium composite oxide is formed by mixing powder of the first compound and the second compound with powder of one, or two or more raw materials (oxide raw materials) of lithium composite oxide, and firing the resultant mixture. In this case, generally, in the case where the first compound and the oxide raw material are mixed and the resultant mixture is subsequently fired, the first compound exists on the surface of particles (or the surface of particle boundary) of the lithium composite oxide. Such a state is similarly observed in the case where the second compound and the oxide raw material are mixed and the resultant mixture is subsequently fired. Meanwhile, in the case where the first compound, the second compound, and the oxide raw material are mixed and the resultant mixture is subsequently fired, a firing treatment is performed in a state that the first compound and the second compound exist together. Thereby, in synthesizing the lithium composite oxide, while the first compound is not dissolved, and exists not only on the surface of the particles of the lithium composite oxide but also inside of the particles, the second compound exists in a state of being aggregated on the surface of the lithium composite oxide. More specifically, the first compound is aggregated inside the particles (on the crystal particle boundary or inside a crystallite) of the lithium composite oxide in a state of an oxide, a composite oxide, a stable salt, or the like, and is adhered to the surface of the particles of the lithium composite oxide while being aggregated. On the other hand, the second compound is adhered to the surface of the particles of the lithium composite oxide while being aggregated in a state of an oxide, a composite oxide, a stable salt, or the like. Details of such a mechanism are not known. However, it is considered that, since the second compound exists on the surface of the particles of the lithium composite oxide, local valency balance of the particles is disrupted, leading to a stable electron structure at the time of firing. Accordingly, part of the first compound is moved from the surface of the particles to inside of the particles.

The composition of the lithium composite oxide is not particularly limited as long as the lithium composite oxide contains Li and a transition metal element as constituent elements. It is to be noted that the lithium composite oxide may contain other one, or two or more elements as constituent elements together with Li and the transition metal element. One reason for this is that, as long as an oxide containing Li and the transition metal element as constituent elements is used, high energy density is obtained without depending on the composition thereof.

More specifically, the lithium composite oxide is preferably one, or two or more of compounds represented by Formula (1) and Formula (2) described below, since thereby high energy density is obtained.

$$Li_aM1_bM2_cO_2 \quad (1)$$

In Formula (1), M1 represents one or more of Ni, Co, and Mn; M2 represents one or more of aluminum (Al), magnesium (Mg), vanadium (V), chromium (Cr), iron (Fe), copper (Cu), zinc (Zn), yttrium (Y), niobium (Nb), molybdenum (Mo), barium (Ba), bismuth (Bi), calcium (Ca), and boron (B); and a to c satisfy $0.01<a<1.3$, $0.9<b<1.05$, and $0 \leq c<0.1$.

$$Li_dM3_eM4_fO_4 \quad (2)$$

In Formula (2), M3 represents one or more of Ni, Co, and Mn; M4 represents one or more of Al, Mg, V, Cr, Fe, Cu, Zn, Y, Nb, Mo, Ba, Bi, Ca, and B; and d to f satisfy $0.01<d<1.3$, $1.8<e<2.1$, and $0 \leq f<0.2$.

The lithium composite oxide represented by Formula (1) is a compound having a bedded-salt type crystal structure. Specific examples thereof include $LiCo_{0.98}O_2$, $Li_{0.99}CO_{0.98}O_2$, $LiCo_{0.96}Al_{0.01}Mg_{0.01}O_2$, $Li_{1.03}Ni_{0.75}Co_{0.2}Al_{0.03}O_2$, and $LiNi_{0.48}Co_{0.2}Mn_{0.3}O_2$. The lithium composite oxide represented by Formula (2) is a compound having a spinel type crystal structure. Specific examples thereof include $LiMn_{1.98}O_4$. However, other compounds satisfying the conditions of the chemical formulas shown in Formula (1) or Formula (2) may be used.

The composition of the first compound is not particularly limited as long as the first metal element (Zr and/or the like) different from the main constituent elements (transition metal elements) of the lithium composite oxide is contained as a constituent element. It is to be noted that the first compound may contain other one, or two or more elements as constituent elements together with the first metal element. One reason for this is that, as long as a compound containing the first metal element as a constituent element is used, part of the first compound is easily moved from the surface of the particles of the lithium composite oxide to inside of the particles at the time of firing without depending on the composition thereof.

Specially, the first compound preferably contains, for example, oxygen (O) as a constituent element together with the first metal element. More specifically, the first compound is preferably one, or two or more of compounds represented by Formula (3) described below, since the first compound is thereby more easily moved to the inside of the particles of the lithium composite oxide.

$$Li_gM5_hO_i \quad (3)$$

In Formula (3), M5 represents Zr or Ti or both; and g to i satisfy $0 \leq g \leq 4$, $0 < h \leq 5$, and $0 < i \leq 12$.

Specific examples of the first compound include $ZrO_2$, $TiO_2$, $Li_2ZrO_3$, and $Li_4Ti_5O_{12}$. However, other compounds satisfying the conditions of the chemical formula shown in Formula (3) may be used.

The composition of the second compound is not particularly limited as long as the second metal element (such as Na) different from the main constituent elements (first metal elements) of the first compound is contained as a constituent element. It is to be noted that the second compound may contain other one, or two or more elements as constituent elements together with the second metal element. One reason for this is that, as long as a compound containing the second metal element as a constituent element is used, the second compound easily exists on the surface of the particles of the lithium composite oxide without depending on the composition thereof.

Specially, the second compound preferably contains, for example, phosphorus (P) as a constituent element together with the second metal element. It is more preferable that second compound be a phosphate compound containing one, or two or more $PO_4$. Thereby, the second compound easily exists on the surface of the particles of the lithium composite oxide, and the first compound is easily moved to the inside of the particles of the lithium composite oxide at the time of firing.

More specifically, the second compound is preferably one, or two or more of compounds represented by Formula (4) described below, since the second compound thereby easily exists on the surface of the particles of the lithium composite oxide.

$$M6_jP_kO_mF_n \quad (4)$$

In Formula (4), M6 represents one or more of Na, Li, Mg, Zn, Mn, and Ba; and j, k, m, and n satisfy $0 < j \leq 6$, $0 < k \leq 5$, $0 < m \leq 14$, and $0 < n \leq 6$.

Specific examples of the second compound include $Li_3PO_4$, $Mn_3(PO_4)_2$, $Mg_3(PO_4)_2$, $Zn_3(PO_4)_2$, $Ba(PO_4)_2$, $Na(PO_4)_2$, $Mg_2P_2O_7$, and $Li_2PO_3F$. However, other compound satisfying the conditions of the chemical formula shown in Formula (4) may be used.

It is to be noted that the cathode active material layer 21B may contain other cathode material as a cathode active material together with the foregoing cathode material. "Other cathode material" may be, for example, an oxide, a disulfide, a chalcogenide, a conductive polymer, or the like. Examples of the oxide include titanium oxide, vanadium oxide, and manganese dioxide. Examples of the disulfide include titanium disulfide and molybdenum sulfide. Examples of the chalcogenide include niobium selenide. Examples of the conductive polymer include sulfur, polyaniline, and polythiophene.

Examples of the cathode binder include one, or two or more of synthetic rubbers, polymer materials, and the like. Examples of the synthetic rubber include a styrene-butadiene-based rubber, a fluorine-based rubber, and ethylene propylene diene. Examples of the polymer material include polyvinylidene fluoride and polyimide.

Examples of the cathode electric conductor include one, or two or more of carbon materials and the like. Examples of the carbon materials include graphite, carbon black, acetylene black, and Ketjen black. The cathode electric conductor may be a metal material, a conductive polymer, or the like as long as the material has electric conductivity.

[Anode]

In the anode 22, for example, an anode active material layer 22B is provided on a single surface or both surfaces of an anode current collector 22A.

The anode current collector 22A may be made of, for example, a conductive material such as Cu, Ni, and stainless steel. The surface of the anode current collector 22A is preferably roughened. Thereby, due to what we call an anchor effect, adhesion characteristics of the anode active material layer 22B with respect to the anode current collector 22A are improved. In this case, it is enough that the surface of the anode current collector 22A in the region opposed to the anode active material layer 22B is roughened at minimum. Examples of roughening methods include a method of forming fine particles by electrolytic treatment. The electrolytic treatment is a method of providing concavity and convexity by forming fine particles on the surface of the anode current collector 22A by an electrolytic method in an electrolytic bath. A copper foil formed by an electrolytic method is generally called "electrolytic copper foil."

The anode active material layer 22B contains one, or two or more of anode materials capable of inserting and extracting lithium ions as anode active materials, and may also contain other materials such as an anode binder and an anode electric conductor as necessary. Details of the anode binder and the anode electric conductor are, for example, similar to those of the cathode binder and the cathode electric conductor, respectively. In the anode active material layer 22B, the chargeable capacity of the anode material is preferably larger than the discharge capacity of the cathode 21 in order to prevent unintentional precipitation of lithium metal at the time of charge and discharge, for example.

Examples of the anode material include a carbon material. In the carbon material, its crystal structure change at the time of insertion and extraction of lithium ions is extremely small. Therefore, the carbon material provides high energy density and superior cycle characteristics. Further, the carbon material functions as an anode electric conductor as well. Examples of the carbon material include graphitizable carbon, non-graphitizable carbon in which the spacing of (002) plane is equal to or greater than 0.37 nm, and graphite in which the spacing of (002) plane is equal to or smaller than 0.34 nm. More specifically, examples of the carbon material include pyrolytic carbons, cokes, glassy carbon fiber, an organic polymer compound fired body, activated carbon, and carbon blacks. Of the foregoing, examples of the cokes include pitch coke, needle coke, and petroleum coke. The organic polymer compound fired body is obtained by firing (carbonizing) a polymer compound such as a phenol resin and a furan resin at appropriate temperature. In addition thereto, the carbon material may be low crystalline carbon or amorphous carbon heat-treated at temperature of about 1000 deg C. or less. The shape of the carbon material may be any of a fibrous shape, a spherical shape, a granular shape, and a scale-like shape.

Further, the anode material may be, for example, a material (metal-based material) containing one, or two or more of metal elements and metalloid elements as constituent elements, since high energy density is thereby obtained. Such a metal-based material may be a simple substance, an alloy, or a compound, may be two or more thereof, or may have one or more phases thereof in part or all thereof "Alloy" includes a material containing one or more metal elements and one or more metalloid elements, in addition to a material configured of two or more metal elements. Further, the alloy may contain a nonmetallic element. Examples of the structure thereof include a solid solution, a eutectic crystal (eutectic mixture), an intermetallic compound, and a structure in which two or more thereof coexist.

The foregoing metal element and the foregoing metalloid element may be, for example, one, or two or more of metal elements and metalloid elements capable of forming an alloy with Li. Specific examples thereof include Mg, B, Al, Ga, In, Si, Ge, Sn, Pb, Bi, Cd, Ag, Zn, Hf, Zr, Y, Pd, and Pt. Specially, Si or Sn or both are preferably used. Si and Sn have a high ability of inserting and extracting lithium ions, and therefore provide high energy density.

A material containing Si or Sn or both may be a simple substance, an alloy, or a compound of Si or Sn; two or more thereof; or a material having one, or two or more phases thereof in part or all thereof. The simple substance merely refers to a general simple substance (a small amount of impurity may be therein contained), and does not necessarily refer to a purity 100% simple substance.

Examples of the alloys of Si include a material containing one, or two or more of elements such as Sn, Ni, Cu, Fe, Co, Mn, Zn, In, Ag, Ti, Ge, Bi, Sb, and Cr as constituent elements other than Si. Examples of the compounds of Si include a material containing C or O as a constituent element other than Si. It is to be noted that, for example, the compounds of Si may contain one, or two or more of the elements described for the alloys of Si as constituent elements other than Si.

Examples of the alloys and the compounds of Si include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ (0<v≤2), and LiSiO. v in $SiO_v$ may be in the range of 0.2<v<1.4.

Examples of the alloys of Sn include a material containing one, or two or more of elements such as Si, Ni, Cu, Fe, Co, Mn, Zn, In, Ag, Ti, Ge, Bi, Sb, and Cr as constituent elements other than Sn. Examples of the compounds of Sn include a material containing C or O as a constituent element. The compounds of Sn may contain, for example, one, or two or more of the elements described for the alloys of Sn as constituent elements other than Sn. Examples of the alloys and the compounds of Sn include $SnO_w$ (0<w≤2), $SnSiO_3$, LiSnO, and $Mg_2Sn$.

Further, as a material containing Sn, for example, a material containing a second constituent element and a third constituent element in addition to Sn as a first constituent element is preferable. Examples of the second constituent element include one, or two or more of elements such as Co, Fe, Mg, Ti, V, Cr, Mn, Ni, Cu, Zn, Ga, Zr, Nb, Mo, Ag, In, Ce, Hf, Ta, W, Bi, and Si. Examples of the third constituent element include one, or two or more of B, C, Al, and P. In the case where the second constituent element and the third constituent element are contained, a high battery capacity, superior cycle characteristics, and the like are obtained.

Specially, a material containing Sn, Co, and C (SnCoC-containing material) is preferable. The composition of the SnCoC-containing material is, for example, as follows. That is, the C content is from 9.9 mass % to 29.7 mass % both inclusive, and the ratio of Sn and Co contents (Co/(Sn+Co)) is from 20 mass % to 70 mass % both inclusive, since high energy density is obtained in such a composition range.

It is preferable that the SnCoC-containing material have a phase containing Sn, Co, and C. Such a phase is preferably low crystalline or amorphous. The phase is a reaction phase capable of reacting with lithium. Due to existence of the reaction phase, superior characteristics are obtained. The half bandwidth of the diffraction peak obtained by X-ray diffraction of the phase is preferably equal to or greater than 1 deg based on diffraction angle of 2θ in the case where CuKα ray is used as a specific X ray, and the insertion rate is 1 deg/min. Thereby, lithium ions are more smoothly inserted and extracted, and reactivity with the electrolytic solution is decreased. It is to be noted that, in some cases, the SnCoC-containing material includes a phase containing a simple substance or part of the respective constituent elements in addition to the low-crystalline phase or the amorphous phase.

Whether or not the diffraction peak obtained by the X-ray diffraction corresponds to the reaction phase capable of reacting with lithium is allowed to be easily determined by comparison between X-ray diffraction charts before and after electrochemical reaction with lithium. For example, if the position of the diffraction peak after electrochemical reaction with lithium is changed from the position of the diffraction peak before the electrochemical reaction with lithium, the obtained diffraction peak corresponds to the reaction phase capable of reacting with lithium. In this case, for example, the diffraction peak of the low crystalline reaction phase or the amorphous reaction phase is seen in the range of 2θ=from 20 to 50 deg both inclusive. Such a reaction phase has, for example, the foregoing respective constituent elements, and the low crystalline or amorphous structure thereof possibly results from existence of carbon mainly.

In the SnCoC-containing material, part or all of carbon as a constituent element are preferably bonded to a metal element or a metalloid element as other constituent element, since thereby cohesion or crystallization of tin and/or the like is suppressed. The bonding state of elements is allowed to be checked by, for example, X-ray photoelectron spectroscopy (XPS). In a commercially available device, for example, as a soft X ray, Al—Kα ray, Mg—Kα ray, or the like is used. In the case where part or all of carbon are bonded to a metal element, a metalloid element, or the like, the peak of a synthetic wave of is orbit of carbon (C1s) is shown in a region lower than 284.5 eV. It is to be noted that, in the device, energy calibration is made so that the peak of 4f orbit of gold atom (Au4f) is obtained in 84.0 eV. At this time, in general, since surface contamination carbon exists on the material surface, the peak of C1s of the surface contamination carbon is regarded as 284.8 eV, which is used as the energy standard. In XPS measurement, the waveform of the peak of C1s is obtained as a form including the peak of the surface contamination carbon and the peak of carbon in the SnCoC-containing material. Therefore, for example, analysis is made by using commercially available software to isolate both peaks from each other. In the waveform analysis, the position of the main peak existing on the lowest bound energy side is the energy standard (284.8 eV).

It is to be noted that the SnCoC-containing material may further contain, for example, one, or two or more of elements such as Si, Fe, Ni, Cr, In, Nb, Ge, Ti, Mo, Al, P, Ga, and Bi as necessary.

In addition to the SnCoC-containing material, a material containing Sn, Co, Fe, and C (SnCoFeC-containing material) is also preferable. The composition of the SnCoFeC-containing material may be arbitrarily set. For example, the composition in which the Fe content is set small is as follows. That is, the C content is from 9.9 mass % to 29.7 mass % both inclusive, the Fe content is from 0.3 mass % to 5.9 mass % both inclusive, and the ratio of contents of Sn and Co (Co/(Sn+Co)) is from 30 mass % to 70 mass % both inclusive. Further, for example, the composition in which the Fe content is set large is as follows. That is, the C content is from 11.9 mass % to 29.7 mass % both inclusive, the ratio of contents of Sn, Co, and Fe ((Co+Fe)/(Sn+Co+Fe)) is from 26.4 mass % to 48.5 mass % both inclusive, and the ratio of contents of Co and Fe (Co/(Co+Fe)) is from 9.9 mass % to 79.5 mass % both inclusive. In such a composition range, high energy density is obtained. The physical properties (such as half bandwidth) of the SnCoFeC-containing material are similar to those of the foregoing SnCoC-containing material.

In addition thereto, the anode material may be, for example, a metal oxide, a polymer compound, or the like. Examples of the metal oxide include iron oxide, ruthenium oxide, and molybdenum oxide. Examples of the polymer compound include polyacetylene, polyaniline, and polypyrrole.

The anode active material layer 22B is formed by, for example, a coating method, a vapor-phase deposition method, a liquid-phase deposition method, a spraying method, a firing method (sintering method), or a combination of two or more of these methods. The coating method is a method in which, for example, after a particulate anode active material is mixed with an anode binder and/or the like, the mixture is dispersed in a solvent such as an organic solvent, and the anode current collector is coated with the resultant. Examples of the vapor-phase deposition method include a physical deposition method and a chemical deposition method. Specifically, examples thereof include a vacuum evaporation method, a sputtering method, an ion plating method, a laser ablation method, a thermal chemical vapor deposition method, a chemical vapor deposition (CVD) method, and a plasma chemical vapor deposition method. Examples of the liquid-phase deposition method include an electrolytic plating method and an electroless plating method. The spraying method is a method in which an anode active material in a fused state or a semi-fused state is sprayed. The firing method is, for example, a method in which after the anode current collector is coated by a coating method, heat treatment is performed at temperature higher than the melting point of the anode binder and/or the like. Examples of the firing method include a publicly-known technique such as an atmosphere firing method, a reactive firing method, and a hot press firing method.

In the secondary battery, as described above, in order to prevent lithium metal from being unintentionally precipitated on the anode 22 in the middle of charge, the electrochemical equivalent of the anode material capable of inserting and extracting lithium ions is larger than the electrochemical equivalent of the cathode. Further, in the case where the open circuit voltage (that is, a battery voltage) at the time of completely-charged state is equal to or greater than 4.25 V, the extraction amount of lithium ions per unit mass is larger than that in the case that the open circuit voltage is 4.20 V even if the same cathode active material is used. Therefore, amounts of the cathode active material and the anode active material are adjusted in accordance therewith. Thereby, high energy density is obtainable.

[Separator]

The separator 23 separates the cathode 21 from the anode 22, and passes lithium ions while preventing current short circuit resulting from contact of both electrodes. The separator 23 is, for example, a porous film made of a synthetic resin or ceramics. The separator 23 may be a laminated film in which two or more types of porous films are laminated. Examples of the synthetic resin include polytetrafluoroethylene, polypropylene, and polyethylene.

In particular, the separator 23 may include, for example, a base material layer configured of the foregoing porous film and a polymer compound layer provided on one surface or both surfaces of the base material layer. Thereby, adhesion characteristics of the separator 23 with respect to the cathode 21 and the anode 22 are improved, and therefore, skewness of the spirally wound electrode body 20 is suppressed. Thereby, a decomposition reaction of the electrolytic solution is suppressed, and liquid leakage of the electrolytic solution with which the base material layer is impregnated is suppressed. Accordingly, even if charge and discharge are repeated, the resistance of the secondary battery is less likely to be increased, and battery swollenness is suppressed.

The polymer compound layer contains, for example, a polymer material such as polyvinylidene fluoride, since such a polymer material has a superior physical strength and is electrochemically stable. However, the polymer material may be a material other than polyvinylidene fluoride. The polymer compound layer is formed as follows, for example. That is, after a solution in which the polymer material is dissolved is prepared, the surface of the base material layer is coated with the solution, and the resultant is subsequently dried. It is to be noted that, alternatively, the base material layer may be soaked in the solution and may be subsequently dried.

[Electrolytic Solution]

The separator 23 is impregnated with an electrolytic solution as a liquid electrolyte. The electrolytic solution contains a solvent and an electrolyte salt. The electrolytic solution may contain other material such as an additive as necessary.

[Solvent]

The solvent contains one, or two or more of nonaqueous solvents such as an organic solvent.

Examples of the nonaqueous solvents include ethylene carbonate, propylene carbonate, butylene carbonate, dimethyl carbonate, diethyl carbonate, ethyl methyl carbonate, methylpropyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, methyl trimethylacetate, ethyl trimethylacetate, acetonitrile, glutaronitrile, adiponitrile, methoxyacetonitrile, 3-methoxypropionitrile, N,N-dimethylformamide, N-methylpyrrolidinone, N-methyloxazolidinone, N,N'-dimethylimidazolidinone, nitromethane, nitroethane, sulfolane, trimethyl phosphate, and dimethyl sulfoxide. Thereby, a superior battery capacity, superior cycle characteristics, superior conservation characteristics, and the like are obtained.

Specially, one or more of ethylene carbonate, propylene carbonate, dimethyl carbonate, diethyl carbonate, and ethyl methyl carbonate are preferable, since a superior battery capacity, superior cycle characteristics, superior conservation characteristics, and the like are thereby obtained. In this case, a combination of a high viscosity (high dielectric constant) solvent (for example, specific dielectric constant $\in \geq 30$) such as ethylene carbonate and propylene carbonate and a low viscosity solvent (for example, viscosity$\leq 1$ mPa·s) such as dimethyl carbonate, ethylmethyl carbonate, and diethyl carbonate is more preferable. One reason for this is that the dissociation property of the electrolyte salt and ion mobility are improved.

In particular, the solvent preferably contains one, or two or more of unsaturated cyclic ester carbonates. One reason for this is that a stable protective film is formed on the surface of the anode 22 mainly at the time of charge and discharge, and therefore a decomposition reaction of the electrolytic solution is suppressed. The "unsaturated cyclic ester carbonate" refers to a cyclic ester carbonate having one, or two or more unsaturated carbon bonds (carbon-carbon double bonds). Specific examples of the unsaturated cyclic ester carbonate include vinylene carbonate, vinylethylene carbonate, and methylene ethylene carbonate. The content of the unsaturated cyclic ester carbonate in the solvent is not particularly limited, and is, for example, from 0.01 wt % to 10 wt % both inclusive. However, specific examples of the unsaturated cyclic ester carbonate are not limited to the after-mentioned compounds, and other compounds may be used.

Further, the solvent preferably contains one, or two or more of halogenated ester carbonates. One reason for this is that a stable protective film is formed on the surface of the anode 22 at the time of charge and discharge mainly, and therefore, a decomposition reaction of the electrolytic solution is suppressed. The halogenated ester carbonate is a cyclic ester carbonate or a chain ester carbonate having one, or two or more halogens as constituent elements. Examples of the cyclic halogenated ester carbonate include 4-fluoro-1,3-dioxolane-2-one and 4,5-difluoro-1,3-dioxolane-2-one. Examples of the chain halogenated ester carbonate include fluoromethyl methyl carbonate, bis(fluoromethyl) carbonate, and difluoromethyl methyl carbonate. Although the content of the halogenated ester carbonate in the solvent is not particularly limited, for example, the content of the halogenated ester carbonate in the solvent is from 0.01 wt % to 50 wt % both inclusive. However, specific examples of the halogenated ester carbonate are not limited to the foregoing compounds, and may be other compounds.

Further, the solvent preferably contains sultone (cyclic sulfonic ester), since thereby the chemical stability of the electrolytic solution is more improved. Examples of sultone include propane sultone and propene sultone. Although the sultone content in the solvent is not particularly limited, for example, the sultone content is from 0.5 wt % to 5 wt % both inclusive. However, specific examples of sultone are not limited to the foregoing compounds, and may be other compounds.

Further, the solvent preferably contains an acid anhydride since the chemical stability of the electrolytic solution is thereby further improved. Examples of the acid anhydrides include a carboxylic anhydride, a disulfonic anhydride, and a carboxylic acid sulfonic acid anhydride. Examples of the carboxylic anhydride include a succinic anhydride, a glutaric anhydride, and a maleic anhydride. Examples of the disulfonic anhydride include an ethane disulfonic anhydride and a propane disulfonic anhydride. Examples of the carboxylic acid sulfonic acid anhydride include a sulfobenzoic anhydride, a sulfopropionic anhydride, and a sulfobutyric anhydride. Although the content of the acid anhydride in the solvent is not particularly limited, for example, the content thereof is from 0.5 wt % to 5 wt % both inclusive. However, specific examples of the acid anhydrides are not limited to the foregoing compounds, and other compound may be used.

[Electrolyte Salt]

The electrolyte salt may contain, for example, one, or two or more of lithium salts described below. However, the electrolyte salt may be a salt other than the lithium salt (such as a light metal salt other than the lithium salt).

Examples of the lithium salts include compounds such as $LiPF_6$, $LiBF_4$, $LiClO_4$, $LiAsF_6$, $LiB(C_6H_5)_4$, $LiCH_3SO_3$, $LiCF_3SO_3$, $LiAlCl_4$, $Li_2SiF_6$, $LiCl$, and $LiBr$. Thereby, a superior battery capacity, superior cycle characteristics, superior conservation characteristics, and the like are obtained.

Specially, one or more of $LiPF_6$, $LiBF_4$, $LiClO_4$, and $LiAsF_6$ are preferable, and $LiPF_6$ is more preferable, since the internal resistance is thereby lowered, and therefore, a higher effect is obtained.

The content of the electrolyte salt is preferably from 0.3 mol/kg to 3.0 mol/kg both inclusive with respect to the solvent, since thereby high ion conductivity is obtained.

[Operation of Secondary Battery]

In the secondary battery, for example, at the time of charge, lithium ions extracted from the cathode 21 are inserted in the anode 22 through the electrolytic solution. Further, at the time of discharge, lithium ions extracted from the anode 22 are inserted in the cathode 21 through the electrolytic solution.

Charge and discharge conditions of the secondary battery are not particularly limited. Specially, the upper limit value of the charge voltage is preferably from 4.2 V to 4.8 V both inclusive, and the lower limit value of the discharge voltage is preferably from 2 V to 3.3 V both inclusive. Further, the upper limit value of the charge voltage is more preferably from 4.25 V to 4.8 V both inclusive, and the lower limit value of the discharge voltage is more preferably from 2 V to 3.3 V both inclusive. One reason for this is that, even under the foregoing voltage conditions, the advantage that both electrochemical stability of the cathode active material and decomposition suppression of the electrolytic solution are achieved is obtainable.

[Method of Manufacturing Secondary Battery]

The secondary battery is manufactured, for example, by the following procedure.

First, the cathode 21 is formed. The first compound, the second compound, and the raw material of the lithium composite oxide are mixed and the resultant mixture is subsequently fired to obtain the lithium composite oxide having the first compound and the second compound. Subsequently, the cathode active material (lithium composite oxide) is mixed with a cathode binder, a cathode electric conductor, and/or the like as necessary to prepare a cathode mixture. Subsequently, the cathode mixture is dispersed in an organic solvent or the like to obtain paste cathode mixture slurry. Subsequently, both surfaces of the cathode current collector 21A are coated with the cathode mixture slurry, which is dried to form the cathode active material layer 21B. Subsequently, the cathode active material layer 21B is compression-molded by using a roll pressing machine and/or the like while being heated as necessary. In this case, compression-molding may be repeated several times.

Further, the anode 22 is formed by a procedure similar to that of the cathode 21 described above. An anode active material is mixed with an anode binder, an anode electric conductor, and/or the like as necessary to prepare an anode mixture, which is subsequently dispersed in an organic solvent or the like to form paste anode mixture slurry. Subsequently, both surfaces of the anode current collector 22A are coated with the anode mixture slurry, which is dried to form the anode active material layer 22B. After that, the anode active material layer 22B is compression-molded as necessary.

Further, after an electrolyte salt is dispersed in a solvent to prepare an electrolytic solution.

Finally, the secondary battery is assembled by using the cathode 21 and the anode 22. First, the cathode lead 25 is attached to the cathode current collector 21A by using a welding method and/or the like, and the anode lead 26 is attached to the anode current collector 22A by using a welding method and/or the like. Subsequently, the cathode 21 and the anode 22 are layered with the separator 23 in between and are spirally wound, and thereby the spirally wound electrode body 20 is formed. After that, the center pin 24 is inserted in the center of the spirally wound electrode body 20. Subsequently, the spirally wound electrode body 20 is sandwiched between the pair of insulating plates 12 and 13, and is contained in the battery can 11. In this case, the end tip of the cathode lead 25 is attached to the safety valve mechanism 15 by using a welding method and/or the like, and the end tip of the anode lead 26 is attached to the battery can 11 by using a welding method and/or the like. Subsequently, the electrolytic solution is injected into the battery can 11, and the separator 23 is impregnated with the electrolytic solution. Subsequently, at the open end of the battery can 11, the battery cover 14, the safety valve mechanism 15, and the PTC device 16 are fixed by being swaged with the gasket 17.

[Function and Effect of Secondary Battery]

According to the cylindrical type secondary battery, the cathode active material layer 21B of the cathode 21 contains the first compound and the second compound together with the lithium composite oxide. The first compound contains the first metal element different from the transition metal elements of the lithium composite oxide as a constituent element, and exists on the surface of the lithium composite oxide and inside thereof. Further, the second compound contains the second metal element different from the first metal element of the first compound, and exists on the surface of the lithium composite oxide. In this case, as described above, due to synergetic action between the first compound and the second compound, both electrochemical stability of the cathode active material and decomposition suppression of the electrolytic solution are achieved. Accordingly, a high battery capacity is obtained, and the discharge capacity is less likely to be lowered even if charge and discharge are repeated. Accordingly, superior battery characteristics are obtainable.

In particular, in the case where the first compound contains Zr and/or the like as the first metal element, or the second compound contains Na and/or the like as the second metal element, the first compound easily exists on the surface of the particles of the lithium composite oxide and inside of the particles of the lithium composite oxide, and the second compound easily exists on the surface of the particles of the lithium composite oxide. Further, the foregoing state is similarly observed in the case where the second compound contains P as a constituent element, more specifically, in the case where the second compound is a phosphate compound. Therefore, synergetic action between the first compound and the second compound is further exhibited, and higher effects are obtainable.

Further, in the case where the lithium composite oxide contains Co as a constituent element, a higher battery capacity is obtainable.

Further, in the case where the lithium composite oxide is the compound represented by Formula (1) or the compound represented by Formula (2) or both, the first compound is the compound represented by Formula (3), and the second compound is the compound represented by Formula (4), higher effects are obtainable.

Further, in the case where the upper limit value of the charge voltage is from 4.2 V to 4.8 V both inclusive, and more specifically, from 4.25 V to 4.8 V both inclusive, higher effects are obtainable, since even under the foregoing high voltage conditions, both electrochemical stability of the cathode active material and decomposition suppression of the electrolytic solution are achieved.

[1-2. Lithium Ion Secondary Battery (Laminated Film Type)]

Figure 3:
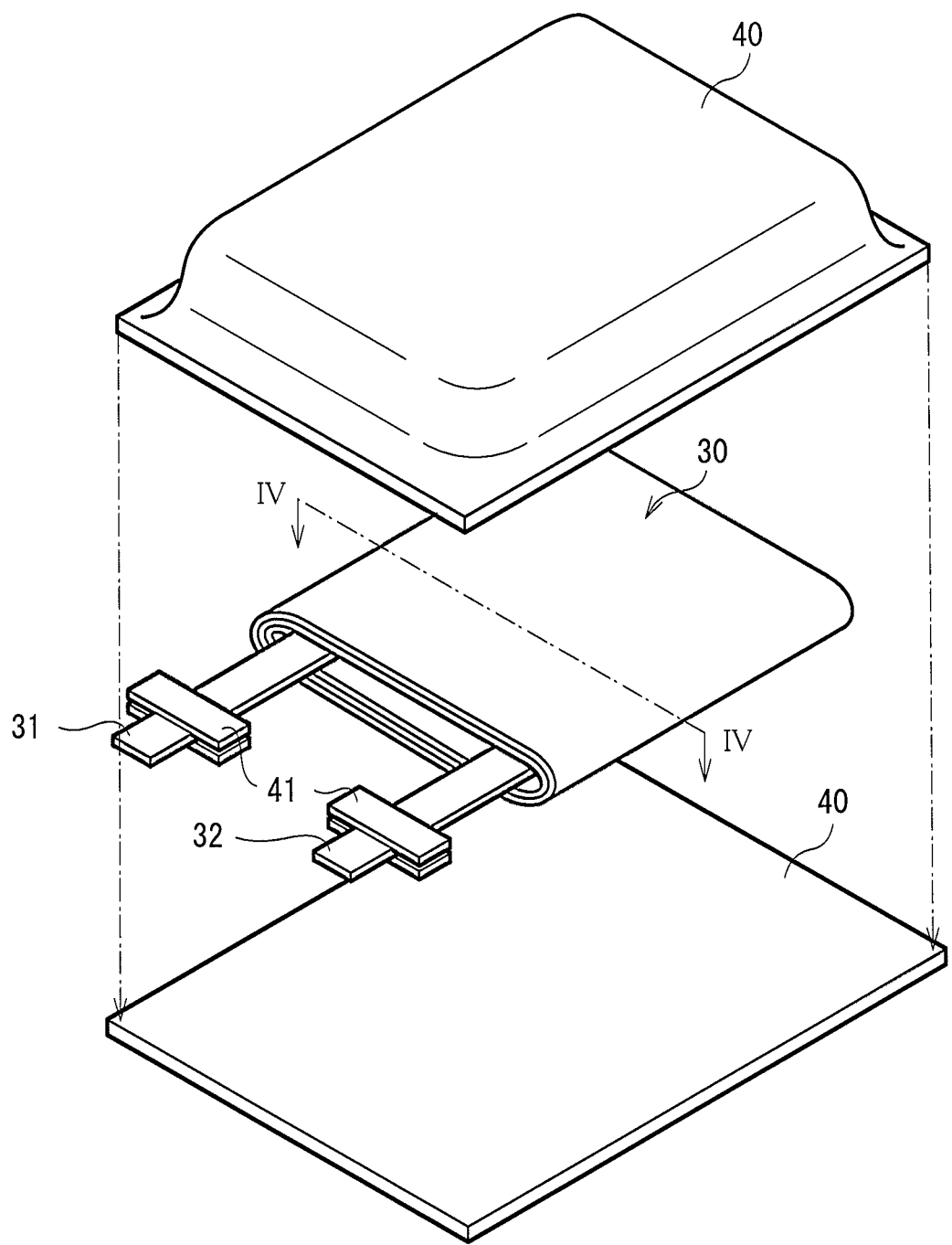
FIG. 3 is a perspective view illustrating a configuration of another secondary battery (laminated film type) including the electrode according to the embodiment of the present application.
Figure 4:
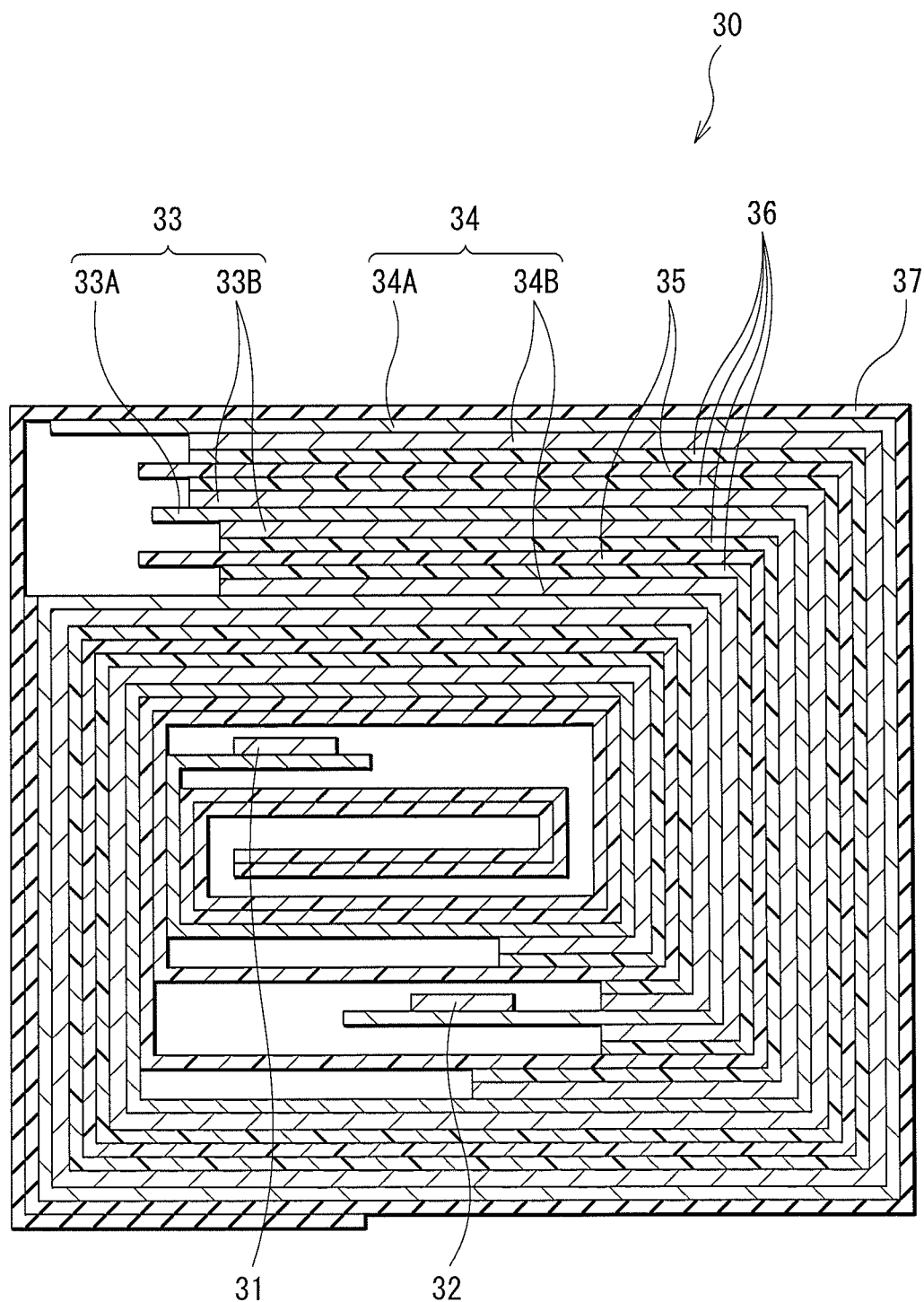
FIG. 4 is a cross-sectional view taken along a line IV-IV of a spirally wound electrode body illustrated in FIG. 3.

FIG. 3 illustrates an exploded perspective configuration of another secondary battery according to an embodiment of the present application. FIG. 4 illustrates an enlarged cross-section taken along a line IV-IV of a spirally wound electrode body 30 illustrated in FIG. 3. In this case, for example, the electrode according to the embodiment of the present application described above is used as a cathode 33. In the following description, the elements of the cylindrical type secondary battery described above will be used as necessary.

[Whole Configuration of Secondary Battery]

The secondary battery is what we call a laminated-film type lithium ion secondary battery. In the secondary battery, the spirally wound electrode body 30 is contained in a film-like outer package member 40. In the spirally wound electrode body 30, the cathode 33 and an anode 34 are layered with a separator 35 and an electrolyte layer 36 in between and are spirally wound. A cathode lead 31 is attached to the cathode 33, and an anode lead 32 is attached to the anode 34. The outermost periphery of the spirally wound electrode body 30 is protected by a protective tape 37.

The cathode lead 31 and the anode lead 32 are, for example, led out from the inside to the outside of the outer package member 40 in the same direction. The cathode lead 31 is made of, for example, a conductive material such as Al, and the anode lead 32 is made of, for example, a conducive material such as Cu, Ni, and stainless steel. These conductive materials are in the shape of, for example, a thin plate or mesh.

The outer package member 40 is a laminated film in which, for example, a fusion bonding layer, a metal layer, and a surface protective layer are laminated in this order. In the laminated film, for example, the respective outer edges of the fusion bonding layers of two films are bonded to each other by fusion bonding, an adhesive, or the like so that the fusion bonding layers and the spirally wound electrode body 30 are opposed to each other. Examples of the fusion bonding layer include a film made of polyethylene, polypropylene, or the like. Examples of the metal layer include an aluminum foil. Examples of the surface protective layer include a film made of nylon, polyethylene terephthalate, or the like.

Specially, as the outer package member 40, an aluminum laminated film in which a polyethylene film, an aluminum foil, and a nylon film are laminated in this order is preferable. However, the outer package member 40 may be made of a laminated film having other laminated structure, a polymer film such as polypropylene, or a metal film.

An adhesive film 41 to protect from outside air intrusion is inserted between the outer package member 40, and the cathode lead 31 and the anode lead 32. The adhesive film 41 is made of a material having adhesion characteristics with respect to the cathode lead 31 and the anode lead 32. Examples of such a material include a polyolefin resin such as polyethylene, polypropylene, modified polyethylene, and modified polypropylene.

In the cathode 33, for example, a cathode active material layer 33B is provided on both surfaces of a cathode current collector 33A. In the anode 34, for example, an anode active material layer 34B is provided on both surfaces of an anode current collector 34A. The configurations of the cathode current collector 33A, the cathode active material layer 33B, the anode current collector 34A, and the anode active material layer 34B are similar to the configurations of the cathode current collector 21A, the cathode active material layer 21B, the anode current collector 22A, and the anode active material layer 22B, respectively. Further, the configuration of the separator 35 is similar to the configuration of the separator 23.

In the electrolyte layer 36, an electrolytic solution is held by a polymer compound. The electrolyte layer 36 is what we call a gel electrolyte, since thereby high ion conductivity (for example, 1 mS/cm or more at room temperature) is obtained and liquid leakage of the electrolytic solution is prevented. The electrolyte layer 36 may contain other materials such as an additive as necessary.

Examples of the polymer compound include one, or two or more of polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, polymethacrylic acid methyl, polyacrylic acid, polymethacrylic acid, styrene-butadiene rubber, nitrile-butadiene rubber, polystyrene, polycarbonate, and a copolymer of vinylidene fluoride and hexafluoro propylene. Specially, polyvinylidene fluoride or the copolymer of vinylidene fluoride and hexafluoro propylene is preferable, and polyvinylidene fluoride is more preferable, since such a polymer compound is electrochemically stable.

The composition of the electrolytic solution is similar to the composition of the electrolytic solution of the cylindrical type secondary battery. However, in the electrolyte layer 36 as a gel electrolyte, the solvent of the electrolytic solution refers to a wide concept including not only a liquid solvent but also a material having ion conductivity capable of dissociating the electrolyte salt. Therefore, in the case where a polymer compound having ion conductivity is used, the polymer compound is also included in the solvent.

It is to be noted that the electrolytic solution may be used as it is instead of the gel electrolyte layer 36. In this case, the separator 35 is impregnated with the electrolytic solution.

[Operation of Secondary Battery]

In the secondary battery, for example, at the time of charge, lithium ions extracted from the cathode 33 are inserted in the anode 34 through the electrolyte layer 36. Meanwhile, at the time of discharge, lithium ions extracted from the anode 34 are inserted in the cathode 33 through the electrolyte layer 36.

[Method of Manufacturing Secondary Battery]

The secondary battery including the gel electrolyte layer 36 is manufactured, for example, by the following three types of procedures.

In the first procedure, the cathode 33 and the anode 34 are formed by a formation procedure similar to that of the cathode 21 and the anode 22. In this case, the cathode 33 is formed by forming the cathode active material layer 33B on both surfaces of the cathode current collector 33A, and the anode 34 is formed by forming the anode active material layer 34B on both surfaces of the anode current collector 34A. Subsequently, a precursor solution containing an electrolytic solution, a polymer compound, and a solvent such as an organic solvent is prepared. After that, the cathode 33 and the anode 34 are coated with the precursor solution to form the gel electrolyte layer 36. Subsequently, the cathode lead 31 is attached to the cathode current collector 33A by using a welding method and/or the like and the anode lead 32 is attached to the anode current collector 34A by using a welding method and/or the like. Subsequently, the cathode 33 and the anode 34 provided with the electrolyte layer 36 are layered with the separator 35 in between and are spirally wound to form the spirally wound electrode body 30. After that, the protective tape 37 is adhered to the outermost periphery thereof. Subsequently, after the spirally wound electrode body 30 is sandwiched between two pieces of film-like outer package members 40, the outer edges of the outer package members 40 are bonded by a thermal fusion bonding method and/or the like to enclose the spirally wound electrode body 30 into the outer package members 40. In this case, the adhesive films 41 are inserted between the cathode lead 31 and the anode lead 32, and the outer package member 40.

In the second procedure, the cathode lead 31 is attached to the cathode 33, and the anode lead 32 is attached to the anode 34. Subsequently, the cathode 33 and the anode 34 are layered with the separator 35 in between and are spirally wound to form a spirally wound body as a precursor of the spirally wound electrode body 30. After that, the protective tape 37 is adhered to the outermost periphery thereof. Subsequently, after the spirally wound body is sandwiched between two pieces of the film-like outer package members 40, the outermost peripheries except for one side are bonded by using a thermal fusion bonding method and/or the like to obtain a pouched state, and the spirally wound body is contained in the pouch-like outer package member 40. Subsequently, a composition for electrolyte containing an electrolytic solution, a monomer as a raw material for the polymer compound, a polymerization initiator, and other materials such as a polymerization inhibitor as necessary is prepared, which is injected into the pouch-like outer package member 40. After that, the outer package member 40 is hermetically sealed by using a thermal fusion bonding method and/or the like. Subsequently, the monomer is thermally polymerized. Thereby, a polymer compound is formed, and therefore, the gel electrolyte layer 36 is formed.

In the third procedure, the spirally wound body is formed and contained in the pouch-like outer package member 40 in a manner similar to that of the foregoing second procedure, except that the separator 35 with both surfaces coated with a polymer compound is used. Examples of the polymer compound with which the separator 35 is coated include a polymer (a homopolymer, a copolymer, or a multicomponent copolymer) containing vinylidene fluoride as a component. Specific examples thereof include polyvinylidene fluoride, a binary copolymer containing vinylidene fluoride and hexafluoro propylene as components, and a ternary copolymer containing vinylidene fluoride, hexafluoro propylene, and chlorotrifluoroethylene as components. In addition to the polymer containing vinylidene fluoride as a component, other one, or two or more polymer compounds may be used. Subsequently, an electrolytic solution is prepared and injected into the outer package member 40. After that, the opening of the outer package member 40 is hermetically sealed by using a thermal fusion bonding method and/or the like. Subsequently, the resultant is heated while a weight is applied to the outer package member 40, and the separator 35 is adhered to the cathode 33 and the anode 34 with the polymer compound in between. Thereby, the polymer compound is impregnated with the electrolytic solution, and accordingly, the polymer compound is gelated to form the electrolyte layer 36.

In the third procedure, swollenness of the secondary battery is suppressed more than in the first procedure. Further, in the third procedure, the monomer as a raw material of the polymer compound, the solvent, and the like are less likely to be left in the electrolyte layer 36 compared to in the second procedure. Therefore, the formation step of the polymer compound is favorably controlled. Therefore, sufficient adhesion characteristics are obtained between the cathode 33, the anode 34, and the separator 35, and the electrolyte layer 36.

[Function and Effect of Secondary Battery]

According to the laminated-film type secondary battery, the cathode 33 has a configuration similar to that of the cathode 21 described above. Therefore, for a reason similar to that of the cylindrical type secondary battery, superior battery characteristics are obtainable. Other functions and other effects are similar to those of the cylindrical type secondary battery.

[2. Applications of Secondary Battery]

Next, a description will be given of application examples of the foregoing secondary battery.

Applications of the secondary battery are not particularly limited as long as the secondary battery is used for a machine, a device, an instrument, an apparatus, a system (collective entity of a plurality of devices and the like), or the like that is allowed to use the secondary battery as a driving electric power source, an electric power storage source for electric power storage, or the like. In the case where the secondary battery is used as an electric power source, the secondary battery may be used as a main electric power source (electric power source used preferentially), or an auxiliary electric power source (electric power source used instead of a main electric power source or used being switched from the main electric power source). In the latter case, the main electric power source type is not limited to the secondary battery.

Examples of applications of the secondary battery include mobile electronic apparatuses such as a video camcorder, a digital still camera, a mobile phone, a notebook personal computer, a cordless phone, a headphone stereo, a portable radio, a portable television, and a personal digital assistant. Further examples thereof include a mobile lifestyle electric appliance such as an electric shaver; a memory device such as a backup electric power source and a memory card; an electric power tool such as an electric drill and an electric saw; a battery pack used as an electric power source of a notebook personal computer or the like; a medical electronic apparatus such as a pacemaker and a hearing aid; an electric vehicle such as an electric automobile (including a hybrid automobile); and an electric power storage system such as a home battery system for storing electric power for emergency or the like. It is needless to say that an application other than the foregoing applications may be adopted.

Specially, the secondary battery is effectively applicable to the battery pack, the electric vehicle, the electric power storage system, the electric power tool, the electronic apparatus, or the like. In these applications, since superior battery characteristics are demanded, the characteristics are allowed to be effectively improved by using the secondary battery according to the embodiments of the present application. It is to be noted that the battery pack is an electric power source using a secondary battery, and is what we call an assembled battery or the like. The electric vehicle is a vehicle that works (runs) by using a secondary battery as a driving electric power source. As described above, an automobile including a drive source other than a secondary battery (such as hybrid automobile) may be included. The electric power storage system is a system using a secondary battery as an electric power storage source. For example, in a home electric power storage system, electric power is stored in the secondary battery as an electric power storage source, and the electric power is consumed as necessary. Thereby, home electric products and the like become usable. The electric power tool is a tool in which a movable section (such as a drill) is moved by using a secondary battery as a driving electric power source. The electronic apparatus is an apparatus executing various functions by using a secondary battery as a driving electric power source (electric power supply source).

A description will be specifically given of some application examples of the secondary battery. The configurations of the respective application examples explained below are merely examples, and may be changed as appropriate.

[2-1. Battery Pack]

Figure 5:
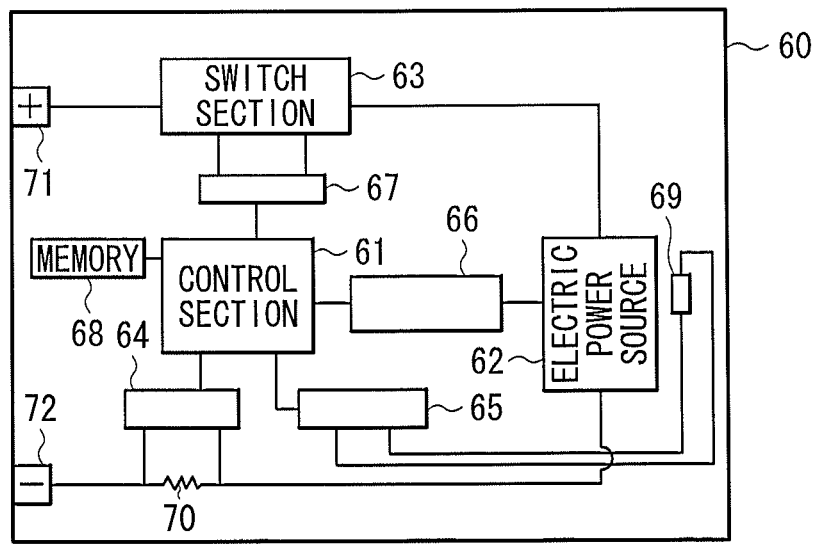
FIG. 5 is a block diagram illustrating a configuration of an application example (battery pack) of the secondary battery.

FIG. 5 illustrates a block configuration of a battery pack. For example, as illustrated in FIG. 5, the battery pack includes a control section 61, an electric power source 62, a switch section 63, a current measurement section 64, a temperature detection section 65, a voltage detection section 66, a switch control section 67, a memory 68, a temperature detection device 69, a current detection resistance 70, a cathode terminal 71, and an anode terminal 72 in a housing 60 made of a plastic material and/or the like.

The control section 61 controls operations of the whole battery pack (including a usage state of the electric power source 62), and includes, for example, a central processing unit (CPU) and/or the like. The electric power source 62 includes one, or two or more secondary batteries (not illustrated). The electric power source 62 is, for example, an assembled battery including two or more secondary batteries. Connection type thereof may be series-connected type, may be parallel-connected type, or a mixed type thereof. As an example, the electric power source 62 includes six secondary batteries connected in a manner of dual-parallel and three-series.

The switch section 63 switches the usage state of the electric power source 62 (whether or not the electric power source 62 is connectable to an external device) according to an instruction of the control section 61. The switch section 63 includes, for example, a charge control switch, a discharge control switch, a charging diode, a discharging diode, and the like (not illustrated). The charge control switch and the discharge control switch are, for example, semiconductor switches such as a field-effect transistor (MOSFET) using a metal oxide semiconductor.

The current measurement section 64 measures a current by using the current detection resistance 70, and outputs the measurement result to the control section 61. The temperature detection section 65 measures temperature by using the temperature detection device 69, and outputs the measurement result to the control section 61. The temperature measurement result is used for, for example, a case in which the control section 61 controls charge and discharge at the time of abnormal heat generation or a case in which the control section 61 performs a correction processing at the time of calculating a remaining capacity. The voltage detection section 66 measures a voltage of the secondary battery in the electric power source 62, performs analog-to-digital conversion (A/D conversion) on the measured voltage, and supplies the resultant to the control section 61.

The switch control section 67 controls operations of the switch section 63 according to signals inputted from the current measurement section 64 and the voltage measurement section 66.

The switch control section 67 executes control so that a charge current is prevented from flowing in a current path of the electric power source 62 by disconnecting the switch section 63 (charge control switch) in the case where, for example, a battery voltage reaches an overcharge detection voltage. Thereby, in the electric power source 62, only discharge is allowed to be performed through the discharging diode. It is to be noted that, for example, in the case where a large current flows at the time of charge, the switch control section 67 blocks the charge current.

Further, the switch control section 67 executes control so that a discharge current is prevented from flowing in the current path of the electric power source 62 by disconnecting the switch section 63 (discharge control switch) in the case where, for example, a battery voltage reaches an overdischarge detection voltage. Thereby, in the electric power source 62, only charge is allowed to be performed through the charging diode. For example, in the case where a large current flows at the time of discharge, the switch control section 67 blocks the discharge current.

It is to be noted that, in the secondary battery, for example, the overcharge detection voltage is 4.20 V±0.05 V, and the over-discharge detection voltage is 2.4 V±0.1 V.

The memory 68 is, for example, an EEPROM as a non-volatile memory or the like. The memory 68 stores, for example, numerical values calculated by the control section 61 and information of the secondary battery measured in a manufacturing step (such as an internal resistance in the initial state). It is to be noted that, in the case where the memory

68 stores a full charge capacity of the secondary battery, the control section 10 is allowed to comprehend information such as a remaining capacity.

The temperature detection device 69 measures temperature of the electric power source 62, and outputs the measurement result to the control section 61. The temperature detection device 69 is, for example, a thermistor or the like.

The cathode terminal 71 and the anode terminal 72 are terminals connected to an external device (such as a notebook personal computer) driven by using the battery pack or an external device (such as a battery charger) used for charging the battery pack. The electric power source 62 is charged and discharged through the cathode terminal 71 and the anode terminal 72.

[2-2. Electric Vehicle]

Figure 6:
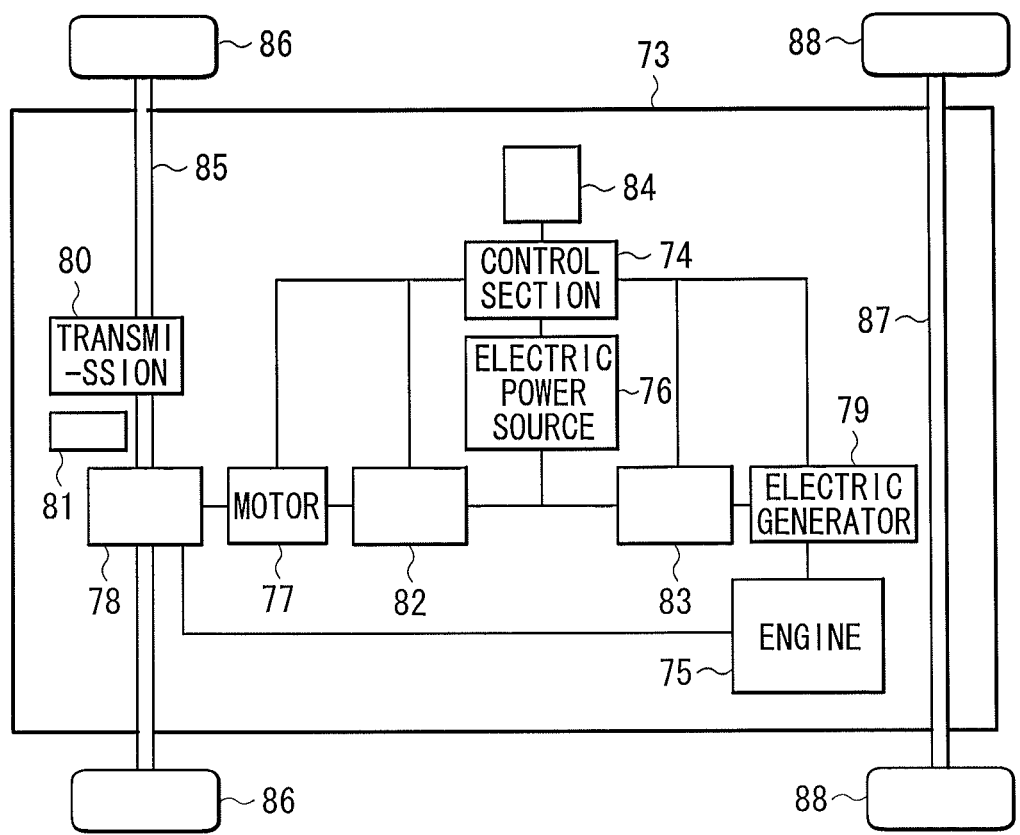
FIG. 6 is a block diagram illustrating a configuration of an application example (electric vehicle) of the secondary battery.

FIG. 6 illustrates a block configuration of a hybrid automobile as an example of electric vehicles. For example, as illustrated in FIG. 6, the electric vehicle includes a control section 74, an engine 75, an electric power source 76, a driving motor 77, a differential 78, an electric generator 79, a transmission 80, a clutch 81, inverters 82 and 83, and various sensors 84 in a housing 73 made of a metal. In addition thereto, the electric vehicle includes, for example, a front drive axis 85 and a front tire 86 that are connected to the differential 78 and the transmission 80, a rear drive axis 87, and a rear tire 88.

The electric vehicle is runnable by using one of the engine 75 and the motor 77 as a drive source. The engine 75 is a main power source, and is, for example, a petrol engine. In the case where the engine 75 is used as a power source, drive power (torque) of the engine 75 is transferred to the front tire 86 or the rear tire 88 through the differential 78, the transmission 80, and the clutch 81 as drive sections, for example. The torque of the engine 75 is also transferred to the electric generator 79. Due to the torque, the electric generator 79 generates alternating-current electric power. The alternating-current electric power is converted to direct-current electric power through the inverter 83, and the converted power is stored in the electric power source 76. On the other hand, in the case where the motor 77 as a conversion section is used as a power source, electric power (direct-current electric power) supplied from the electric power source 76 is converted to alternating-current electric power through the inverter 82. The motor 77 is driven by the alternating-current electric power. Drive power (torque) obtained by converting the electric power by the motor 77 is transferred to the front tire 86 or the rear tire 88 through the differential 78, the transmission 80, and the clutch 81 as the drive sections, for example.

It is to be noted that, alternatively, the following mechanism may be adopted. In the mechanism, in the case where speed of the electric vehicle is reduced by an unillustrated brake mechanism, the resistance at the time of speed reduction is transferred to the motor 77 as torque, and the motor 77 generates alternating-current electric power by the torque. It is preferable that the alternating-current electric power be converted to direct-current electric power through the inverter 82, and the direct-current regenerative electric power be stored in the electric power source 76.

The control section 74 controls operations of the whole electric vehicle, and, for example, includes a CPU and/or the like. The electric power source 76 includes one, or two or more secondary batteries (not illustrated). Alternatively, the electric power source 76 may be connected to an external electric power source, and electric power may be stored by receiving the electric power from the external electric power source. The various sensors 84 are used, for example, for controlling the number of revolutions of the engine 75 or for controlling opening level of an unillustrated throttle valve (throttle opening level). The various sensors 84 include, for example, a speed sensor, an acceleration sensor, an engine frequency sensor, and/or the like.

The description has been hereinbefore given of the hybrid automobile as an electric vehicle. However, examples of the electric vehicles may include a vehicle (electric automobile) working by using only the electric power source 76 and the motor 77 without using the engine 75.

[2-3. Electric Power Storage System]

Figure 7:
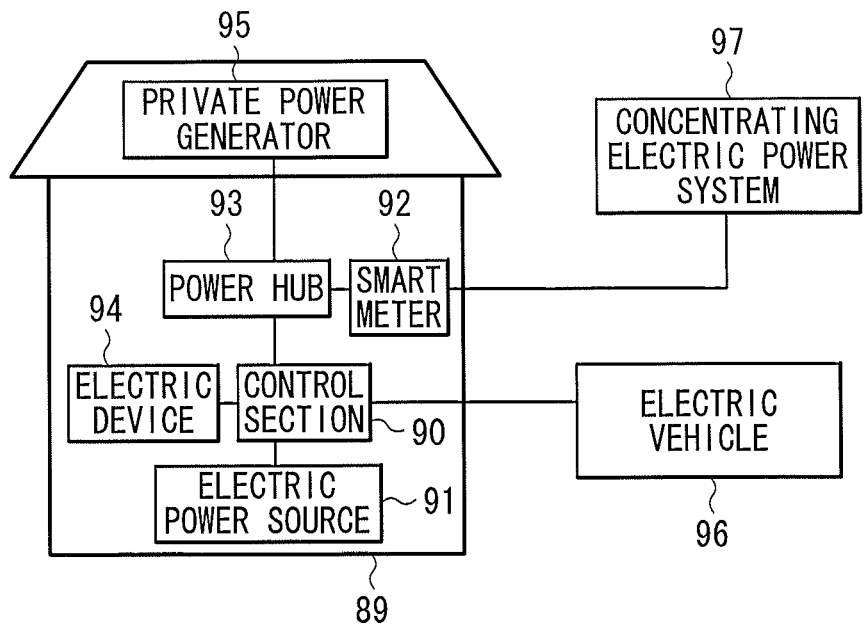
FIG. 7 is a block diagram illustrating a configuration of an application example (electric power storage system) of the secondary battery.

FIG. 7 illustrates a block configuration of an electric power storage system. For example, as illustrated in FIG. 7, the electric power storage system includes a control section 90, an electric power source 91, a smart meter 92, and a power hub 93 inside a house 89 such as a general residence and a commercial building.

In this case, the electric power source 91 is connected to, for example, an electric device 94 arranged inside the house 89, and is connectable to an electric vehicle 96 parked outside the house 89. Further, for example, the electric power source 91 is connected to a private power generator 95 arranged inside the house 89 through the power hub 93, and is connectable to an external concentrating electric power system 97 thorough the smart meter 92 and the power hub 93.

It is to be noted that the electric device 94 includes, for example, one, or two or more home electric appliances such as a refrigerator, an air conditioner, a television, and a water heater. The private power generator 95 is, for example, one, or two or more of a solar power generator, a wind-power generator, and the like. The electric vehicle 96 is, for example, one, or two or more of an electric automobile, an electric motorcycle, a hybrid automobile, and the like. The concentrating electric power system 97 is, for example, one, or two or more of a thermal power plant, an atomic power plant, a hydraulic power plant, a wind-power plant, and the like.

The control section 90 controls operations of the whole electric power storage system (including a usage state of the electric power source 91), and, for example, includes a CPU and/or the like. The electric power source 91 includes one, or two or more secondary batteries (not illustrated). The smart meter 92 is, for example, an electric power meter compatible with a network arranged in the house 89 demanding electric power, and is communicable with an electric power supplier. Accordingly, for example, while the smart meter 92 communicates with external as necessary, the smart meter 92 controls the balance between supply and demand in the house 89 and allows effective and stable energy supply.

In the electric power storage system, for example, electric power is stored in the electric power source 91 from the concentrating electric power system 97 as an external electric power source through the smart meter 92 and the power hub 93, and electric power is stored in the electric power source 91 from the private power generator 95 as an independent electric power source through the power hub 93. As necessary, the electric power stored in the electric power source 91 is supplied to the electric device 94 or the electric vehicle 96 according to an instruction of the control section 90. Therefore, the electric device 94 becomes operable, and the electric vehicle 96 becomes chargeable. That is, the electric power storage system is a system capable of storing and supplying electric power in the house 89 by using the electric power source 91.

The electric power stored in the electric power source 91 is arbitrarily usable. Therefore, for example, electric power is allowed to be stored in the electric power source 91 from the concentrating electric power system 97 in the middle of the night when an electric rate is inexpensive, and the electric power stored in the electric power source 91 is allowed to be used during daytime hours when an electric rate is expensive.

The foregoing electric power storage system may be arranged for each household (family unit), or may be arranged for a plurality of households (a plurality of family units).

[2-4. Electric Power Tool]

Figure 8:
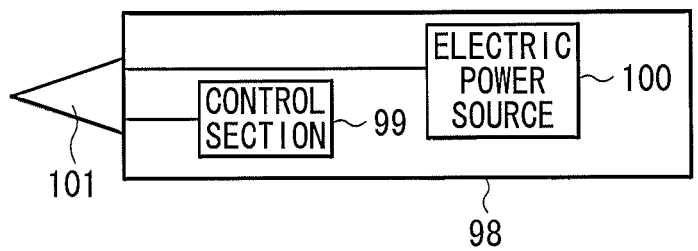
FIG. 8 is a block diagram illustrating a configuration of an application example (electric power tool) of the secondary battery.

FIG. 8 illustrates a block configuration of an electric power tool. For example, as illustrated in FIG. 8, the electric power tool is an electric drill, and includes a control section 99 and an electric power source 100 in a tool body 98 made of a plastic material and/or the like. For example, a drill section 101 as a movable section is attached to the tool body 98 in an operable (rotatable) manner.

The control section 99 controls operations of the whole electric power tool (including a usage state of the electric power source 100), and includes, for example, a CPU and/or the like. The electric power source 100 includes one, or two or more secondary batteries (not illustrated). The control section 99 executes control so that electric power is supplied from the electric power source 100 to the drill section 101 as necessary according to operation of an unillustrated operation switch to operate the drill section 101.

EXAMPLES

Specific Examples according to the embodiments of the present application will be described in detail.

Examples 1 to 27

The cylindrical type lithium ion secondary battery illustrated in FIG. 1 and FIG. 2 was fabricated by the following procedure.

In forming the cathode 21, first, 97 parts by mass of a cathode active material, 2.2 parts by mass of a cathode binder (polyvinylidene fluoride: PVDF), and 0.8 parts by mass of a cathode electric conductor (Ketjen black) were mixed to obtain a cathode mixture. Compositions of the cathode active material were as illustrated in Table 1 and Table 2. Procedures of forming each cathode active material are described later. Subsequently, the cathode mixture was dispersed in an organic solvent (N-methyl-2-pyrrolidone: NMP) to obtain paste cathode mixture slurry. Subsequently, both surfaces of the cathode current collector 21A in the shape of a strip (aluminum foil being 15 µm thick) were coated with the cathode mixture slurry uniformly by using a coating device, which was dried in hot air to form the cathode active material layer 21B. Finally, the cathode active material layer 21B was compression-molded by using a roll pressing machine while being heated.

In forming the anode 22, first, 95 parts by mass of an anode active material (graphite) and 5 parts by mass of an anode binder (PVDF) were mixed to obtain an anode mixture. Subsequently, the anode mixture was dispersed in an organic solvent (NMP) to obtain paste anode mixture slurry. Subsequently, both surfaces of the anode current collector 22A in the shape of a strip (copper foil being 15 µm thick) were coated with the anode mixture slurry uniformly by using a coating device, which was dried in hot air to form the anode active material layer 22B. Finally, the anode active material layer 22B was compression-molded by using a roll pressing machine while being heated.

In preparing an electrolytic solution, an electrolyte salt (LiPF$_6$) was dissolved in a mixed solvent of ethylene carbonate (EC) and ethylmethyl carbonate (EMC). In this case, the composition of the mixed solvent was EC:EMC=50:50 at a volume ratio, and the content of the electrolyte salt with respect to the solvent was 1 mol/dm$^3$ (=1 mol/l).

In assembling the secondary battery, first, the cathode lead 25 made of Al was welded to the cathode current collector 21A, and the anode lead 26 made of Ni was welded to the anode current collector 22A. Subsequently, the cathode 21 and the anode 22 were layered with the separator 23 (porous polyethylene film being 23 µm thick) in between and were spirally wound. After that, the winding end section was fixed by using an adhesive tape to form the spirally wound electrode body 20. Subsequently, the center pin 24 was inserted in the center of the spirally wound electrode body 20. Subsequently, while the spirally wound electrode body 20 was sandwiched between the pair of insulating plates 12 and 13, the spirally wound electrode body 20 was contained in the iron battery can 11 plated with Ni. In this case, one end tip of the cathode lead 25 was welded to the safety valve mechanism 15, and one end tip of the anode lead 26 was welded to the battery can 11. Subsequently, the electrolytic solution was injected into the battery can 11 by a depressurization method, and the separator 23 was impregnated with the electrolytic solution. Finally, at the open end of the battery can 11, the battery cover 14, the safety valve mechanism 15, and the PTC device 16 were fixed by being swaged with the gasket 17. The cylindrical type secondary battery (being 18 mm in diameter and 65 mm high) was thereby completed. In forming the secondary battery, lithium metal was prevented from being precipitated on the anode 22 at the time of full charge by adjusting the thickness of the cathode active material layer 21B.

The procedures of forming each cathode active material used for forming the cathode 21 were as follows.

In Examples 1, 15, and 16, lithium carbonate (Li$_2$CO$_3$), cobalt oxide (Co$_3$O$_4$), lithium zirconate (Li$_2$ZrO$_3$), and lithium phosphate (Li$_3$PO$_4$) were mixed at a molar ratio of Li:Co:Zr:P=1:0.98:0.01:0.01. Subsequently, the resultant mixture was fired in the air (at 900 deg C. for 5 hours) to obtain a lithium composite oxide (LiCo$_{0.98}$O$_2$). The average particle diameter of the lithium composite oxide measured by a laser scattering method was 13 µm. The powder X-ray diffraction pattern (CuKα) of the lithium composite oxide was measured. As a result, a diffraction peak of the first compound (Li$_2$ZrO$_3$) was detected together with diffraction peaks corresponding to the lithium composite oxide (LiCoO$_2$) having a bedded-salt type crystal structure and the second compound (Li$_3$PO$_4$).

In Example 2, a lithium composite oxide (Li$_{0.99}$Co$_{0.98}$O$_2$) was obtained by a procedure similar to that of Example 1, except that Li$_2$CO$_3$, CO$_3$O$_4$, Li$_2$ZrO$_3$, and Li$_3$PO$_4$ were mixed at a molar ratio of Li:Co:Zr:P=0.99:0.98:0.01:0.01. In the powder X-ray diffraction pattern of the lithium composite oxide, diffraction peaks of LiCoO$_2$, Li$_3$PO$_4$, and ZrO$_2$ were detected as in Example 1.

In Examples 3 to 8, a lithium composite oxide (LiCo$_{0.98}$O$_2$) was obtained by a procedure similar to that of Example 1, except that manganese phosphate (Mn$_3$(PO$_4$)$_2$), magnesium phosphate (Mg$_3$(PO$_4$)$_2$), magnesium pyrophosphate (Mg$_2$P$_2$O$_7$), zinc phosphate (Zn$_3$(PO$_4$)$_2$), barium phosphate (Ba$_3$(PO$_4$)$_2$), or sodium phosphate (Na$_3$PO$_4$) was used instead of Li$_3$PO$_4$. The powder X-ray diffraction pattern of the lithium composite oxide was measured. As a result, a diffraction peak of the first compound (Li$_2$ZrO$_3$) was detected together with diffraction peaks corresponding to the lithium composite oxide (LiCoO$_2$) having a bedded-salt type crystal structure and the second compound (Mn$_3$(PO$_4$)$_2$, Mg$_3$(PO$_4$)$_2$, Mg$_2$P$_2$O$_7$, Zn$_3$(PO$_4$)$_2$, Ba$_3$(PO$_4$)$_2$, or Na$_3$PO$_4$).

In Example 9, a lithium composite oxide ($LiCo_{0.98}O_2$) was obtained by a procedure similar to that of Example 1, except that lithium titanate ($Li_4Ti_5O_{12}$) was used instead of $Li_2ZrO_3$. The powder X-ray diffraction pattern of the lithium composite oxide was measured. As a result, a diffraction peak of the first compound ($Li_4Ti_5O_{12}$) was detected together with diffraction peaks corresponding to the lithium composite oxide ($LiCoO_2$) having a bedded-salt type crystal structure and the second compound ($Li_3PO_4$).

In Example 10, a lithium composite oxide ($Li_{0.99}Co_{0.98}O_2$) was obtained by a procedure similar to that of Example 2, except that $Li_4Ti_5O_{12}$ was used instead of $Li_2ZrO_3$. The powder X-ray diffraction pattern of the lithium composite oxide was measured. As a result, a diffraction peak of the first compound ($TiO_2$) was detected together with diffraction peaks corresponding to the lithium composite oxide ($LiCoO_2$) having a bedded-salt type crystal structure and the second compound ($Li_3PO_4$).

In Example 11, a lithium composite oxide ($LiCo_{0.96}Al_{0.01}Mg_{0.01}O_2$) was obtained by a procedure similar to that of Example 1, except that $Li_2CO_3$, $CO_3O_4$, aluminum hydroxide ($Al(OH)_3$), magnesium carbonate ($MgCO_3$), $Li_2ZrO_3$, and $Li_3PO_4$ were mixed at a molar ratio of Li:Co:Al:Mg:Zr:P=1:0.96:0.01:0.01:0.01:0.01. The powder X-ray diffraction pattern of the lithium composite oxide was measured. As a result, a diffraction peak of the first compound ($Li_2ZrO_3$) was detected together with diffraction peaks corresponding to the lithium composite oxide ($LiCoO_2$) having a bedded-salt type crystal structure and the second compound ($Li_3PO_4$).

In Example 12, a lithium composite oxide ($LiMn_{1.98}O_4$) was obtained by a procedure similar to that of Example 1, except that $Li_2CO_3$, manganese dioxide ($MnO_2$), $Li_2ZrO_3$, and $Li_3PO_4$ were mixed at a molar ratio of Li:Mn:Zr:P=1:1.99:0.01:0.01. The powder X-ray diffraction pattern of the lithium composite oxide was measured. As a result, a diffraction peak of the first compound ($Li_2ZrO_3$) was detected together with diffraction peaks corresponding to the lithium composite oxide ($LiMn_2O_4$) having a spinel type crystal structure and the second compound ($Li_3PO_4$).

In Example 13, nickel sulfate ($NiSO_4$), cobalt sulfate ($CoSO_4$), sodium aluminate ($NaAlO_2$), $Li_2ZrO_3$, and $Li_3PO_4$ were dissolved in water. Subsequently, a sodium hydrate (NaOH) solution was added to the resultant aqueous solution while the aqueous solution was sufficiently stirred. Thereby, a nickel-cobalt-aluminum-zirconium-phosphorus composite coprecipitated hydroxide with a molar ratio of Ni:Co:Al:Zr:P=75:20:3:1:1 was obtained. Subsequently, a coprecipitate thereof was washed and dried. After that, the resultant was added with lithium hydroxide monohydrate to obtain a precursor adjusted to have a molar ratio of Li:(Ni+Co+Al+Zr+P)=105:100. Subsequently, the precursor was fired in oxygen stream (at 750 deg C. for 10 hours). After that, the resultant was cooled down to room temperature to obtain a lithium composite oxide ($Li_{1.03}Ni_{0.75}Co_{0.2}Al_{0.03}O_2$). The powder X-ray diffraction pattern of the lithium composite oxide was measured. As a result, a diffraction peak of the first compound ($Li_2ZrO_3$) was detected together with diffraction peaks corresponding to the lithium composite oxide ($LiNi_{0.8}Co_{0.2}O_2$) having a bedded-salt type crystal structure and the second compound ($Li_3PO_4$).

In Example 14, $NiSO_4$, $CoSO_4$, manganese sulfate ($MnSO_4$), $Li_2ZrO_3$, and $Li_3PO_4$ were dissolved in water. Subsequently, an NaOH solution was added to the resultant aqueous solution while the aqueous solution was sufficiently stirred. Thereby, a nickel-cobalt-manganese-zirconium-phosphorus composite coprecipitated hydroxide with a molar ratio of Ni:Co:Mn:Zr:P=48:20:30:1:1 was obtained. Subsequently, a coprecipitate thereof was washed and dried. After that, the resultant was added with lithium hydroxide monohydrate to obtain a precursor adjusted to have a molar ratio of Li:(Ni+Co+Mn+Zr+P)=102:100. Subsequently, the precursor was fired in oxygen stream (at 730 deg C. for 8 hours). After that, the resultant was cooled down to room temperature to obtain a lithium composite oxide ($LiNi_{0.48}Co_{0.2}Mn_{0.3}O_2$). The powder X-ray diffraction pattern of the lithium composite oxide was measured. As a result, a diffraction peak of the first compound ($Li_2ZrO_3$) was detected together with diffraction peaks corresponding to the lithium composite oxide ($LiNi_{0.5}Co_{0.2}Mn_{0.3}O_2$) having a bedded-salt type crystal structure and the second compound ($Li_3PO_4$).

In Example 17, a lithium composite oxide ($LiCo_{0.98}O_2$) was obtained by a procedure similar to that of Example 1, except that $Li_2ZrO_3$ and $Li_3PO_4$ were not used. The powder X-ray diffraction pattern ($CuK\alpha$) of the lithium composite oxide was measured. As a result, a diffraction peak corresponding to the lithium composite oxide ($LiCoO_2$) having a bedded-salt type crystal structure was obtained.

In Examples 18, 26, and 27, a lithium composite oxide ($LiCo_{0.98}O_2$) was obtained by a procedure similar to that of Example 1, except that $Li_3PO_4$ was not used. The powder X-ray diffraction pattern of the lithium composite oxide was measured. As a result, a diffraction peak of the first compound ($Li_2ZrO_3$) was detected together with a diffraction peak corresponding to the lithium composite oxide ($LiCoO_2$) having a bedded-salt type crystal structure.

In Example 19, a lithium composite oxide ($LiCo_{0.98}O_2$) was obtained by a procedure similar to that of Example 1, except that $Li_2ZrO_3$ was not used. The powder X-ray diffraction pattern of the lithium composite oxide was measured. As a result, diffraction peaks corresponding to the lithium composite oxide ($LiCoO_2$) having a bedded-salt type crystal structure and the second compound ($Li_3PO_4$) were detected.

In Examples 20 to 25, lithium composite oxides (such as $Li_{0.99}Co_{0.98}O_2$) were obtained by procedures similar to those of Examples 2, 9, and 11 to 14, respectively, except that $Li_3PO_4$ was not used. The powder X-ray diffraction patterns of the lithium composite oxides were measured. As a result, a diffraction peak of the first compound ($Li_2ZrO_3$) was detected together with a diffraction peak corresponding to the lithium composite oxide ($LiCoO_2$ or the like or $LiMn_2O_4$) having a bedded-salt type crystal structure or a spinel type crystal structure.

Figure 9A:
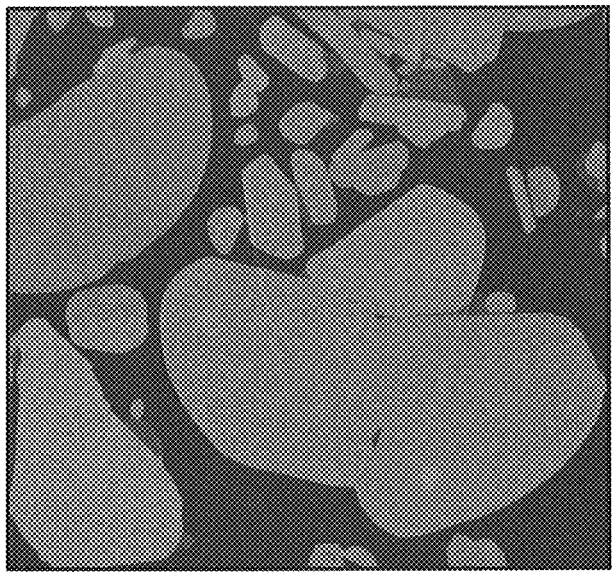
FIG. 9A illustrates a microscope photograph of a cross section of a lithium composite oxide.
Figure 9B:
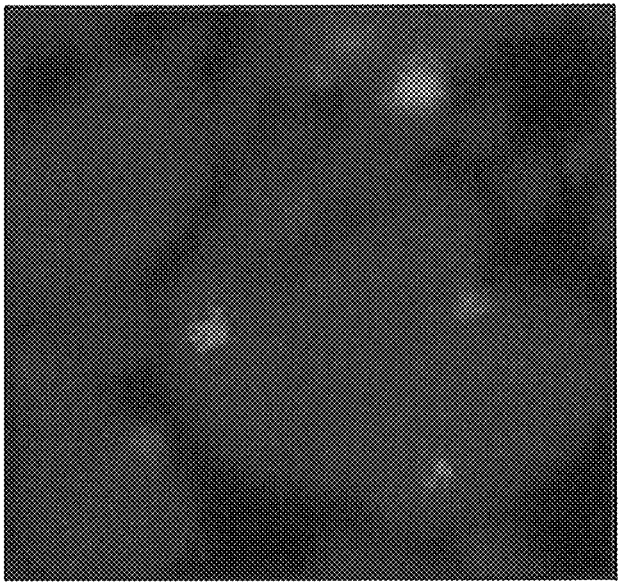
FIG. 9B illustrates an element distribution thereof.

As a representative of the foregoing Examples, the lithium composite oxide powder of Example 1 was cut, and a cross section of the lithium composite oxide was subjected to element analysis by using a scanning analytical electron microscope (SEM/EDX). Accordingly, results illustrated in FIGS. 9A and 9B were obtained. FIG. 9A illustrates an SEM photograph, and FIG. 9B illustrates an element distribution corresponding to FIG. 9A. In the element distribution, a blue region indicates Co in the lithium composite oxide ($LiCo_{0.98}O_2$), a red region indicates Zr in the first compound ($Li_2ZrO_3$), and a green region indicates P in the second compound ($Li_3PO_4$).

As can be seen in the element distribution illustrated in FIG. 9B, though the first compound and the second compound were mixed and fired with the raw material of the lithium composite oxide, the distribution of the first compound is different from that of the second compound. Specifically, red Zr exists not only on the surface of the particles of the lithium composite oxide, but also inside of the particles, and green P exists only on the surface of the particles of the lithium composite oxide. Therefore, the first compound exists both on the surface of the particles of the lithium composite oxide and inside of the particles. On the other hand, the second compound exists on the surface of the particles of the lithium composite oxide.

Initial capacity characteristics and cycle characteristics of the respective secondary batteries were examined. Results illustrated in Table 1 and Table 2 were obtained.

In examining the initial capacity characteristics, one cycle of charge and discharge was performed on the secondary batteries in the high temperature environment (45 deg C.), and the initial capacities (mAh) were measured. As charge conditions, the charge current was 1 A, the charge voltages were values illustrated in Table 1 and Table 2, and the charge time was 2.5 hours. As discharge conditions, the discharge current was 2 A and the final voltage was 3 V.

In examining the cycle characteristics, one cycle of charge and discharge was performed on the secondary batteries under conditions similar to those in examining the initial capacity characteristics, and the discharge capacities were measured. Subsequently, the secondary batteries were repeatedly charged and discharged until the total number of cycles reached 300 in the same conditions, and discharge capacities were measured. From these results, capacity retention ratio (%)=(discharge capacity at the 300th cycle/discharge capacity at the first cycle)×100 was calculated.

In the case where the cathode active material contained both the first compound and the second compound together with the lithium composite oxide (Examples 1 to 16), higher initial capacities and higher capacity retention ratios were obtained compared to in the case where the cathode active material did not contain both the first compound and the second compound (Examples 17 to 27).

More specifically, for comparison, the results of the case in which the cathode active material contained neither of the first compound and the second compound (Example 17) were regarded as the standard. In the case where the cathode active material contained only the first compound (Example 18) or in the case where the cathode active material contained only the second compound (Example 19), the initial capacities thereof were lower, however, the capacity retention ratios were higher compared to those of the foregoing standard. From the foregoing results, it is assumable that, in the case where the first compound is combined with the second compound, while a capacity retention ratio is largely increased, an initial capacity is largely decreased. However, in reality, in the case where the cathode active material contained both the first compound and the second compound (Example 1), while the initial capacity was almost retained, the capacity retention ratio was significantly increased compared to those of the foregoing standard and the like. Further, the increase amount

TABLE 1

| | Cathode active material | | | | Capacity |
|---|---|---|---|---|---|
| Example | Lithium composite oxide | First compound | Second compound | Charge voltage (V) | Initial capacity (mAh) | retention ratio (%) |
|---|---|---|---|---|---|---|
| 1 | $LiCo_{0.98}O_2$ | $Li_2ZrO_3$ | $Li_3PO_4$ | 4.2 | 2450 | 91 |
| 2 | $Li_{0.99}Co_{0.98}O_2$ | $ZrO_2$ | $Li_3PO_4$ | 4.2 | 2420 | 84 |
| 3 | $LiCo_{0.98}O_2$ | $Li_2ZrO_3$ | $Mn_3(PO_4)_2$ | 4.2 | 2470 | 89 |
| 4 | $LiCo_{0.98}O_2$ | $Li_2ZrO_3$ | $Mg_3(PO_4)_2$ | 4.2 | 2450 | 87 |
| 5 | $LiCo_{0.98}O_2$ | $Li_2ZrO_3$ | $Mg_2P_2O_7$ | 4.2 | 2440 | 84 |
| 6 | $LiCo_{0.98}O_2$ | $Li_2ZrO_3$ | $Zn_3(PO_4)_2$ | 4.2 | 2390 | 85 |
| 7 | $LiCo_{0.98}O_2$ | $Li_2ZrO_3$ | $Ba_3(PO_4)_2$ | 4.2 | 2460 | 82 |
| 8 | $LiCo_{0.98}O_2$ | $Li_2ZrO_3$ | $Na_3PO_4$ | 4.2 | 2440 | 81 |
| 9 | $LiCo_{0.98}O_2$ | $Li_4Ti_5O_{12}$ | $Li_3PO_4$ | 4.2 | 2380 | 84 |
| 10 | $Li_{0.99}Co_{0.98}O_2$ | $TiO_2$ | $Li_3PO_4$ | 4.2 | 2390 | 85 |
| 11 | $LiCo_{0.96}Al_{0.01}Mg_{0.01}O_2$ | $Li_2ZrO_3$ | $Li_3PO_4$ | 4.2 | 2370 | 92 |
| 12 | $LiMn_{1.98}O_4$ | $Li_2ZrO_3$ | $Li_3PO_4$ | 4.2 | 1510 | 78 |
| 13 | $Li_{1.03}Ni_{0.75}Co_{0.2}Al_{0.03}O_2$ | $Li_2ZrO_3$ | $Li_3PO_4$ | 4.2 | 2610 | 82 |
| 14 | $LiNi_{0.48}Co_{0.2}Mn_{0.3}O_2$ | $Li_2ZrO_3$ | $Li_3PO_4$ | 4.2 | 2540 | 81 |
| 15 | $LiCo_{0.98}O_2$ | $Li_2ZrO_3$ | $Li_3PO_4$ | 4.3 | 2600 | 78 |
| 16 | $LiCo_{0.98}O_2$ | $Li_2ZrO_3$ | $Li_3PO_4$ | 4.4 | 2850 | 65 |

TABLE 2

| | Cathode active material | | | | Capacity |
|---|---|---|---|---|---|
| Example | Lithium composite oxide | First compound | Second compound | Charge voltage (V) | Initial capacity (mAh) | retention ratio (%) |
|---|---|---|---|---|---|---|
| 17 | $LiCo_{0.98}O_2$ | — | — | 4.2 | 2510 | 45 |
| 18 | $LiCo_{0.98}O_2$ | $Li_2ZrO_3$ | — | 4.2 | 2460 | 61 |
| 19 | $LiCo_{0.98}O_2$ | — | $Li_3PO_4$ | 4.2 | 2480 | 58 |
| 20 | $Li_{0.99}Co_{0.98}O_2$ | $ZrO_2$ | — | 4.2 | 2420 | 53 |
| 21 | $LiCo_{0.98}O_2$ | $Li_4Ti_5O_{12}$ | — | 4.2 | 2440 | 52 |
| 22 | $LiCo_{0.96}Al_{0.01}Mg_{0.01}O_2$ | $Li_2ZrO_3$ | — | 4.2 | 2410 | 62 |
| 23 | $LiMn_{1.98}O_4$ | $Li_2ZrO_3$ | — | 4.2 | 1530 | 38 |
| 24 | $Li_{1.03}Ni_{0.75}Co_{0.2}Al_{0.03}O_2$ | $Li_2ZrO_3$ | — | 4.2 | 2650 | 56 |
| 25 | $LiNi_{0.48}Co_{0.2}Mn_{0.3}O_2$ | $Li_2ZrO_3$ | — | 4.2 | 2570 | 44 |
| 26 | $LiCo_{0.98}O_2$ | $Li_2ZrO_3$ | — | 4.3 | 2620 | 42 |
| 27 | $LiCo_{0.98}O_2$ | $Li_2ZrO_3$ | — | 4.4 | 2870 | 25 | of the capacity retention ratio was a value that was significantly higher than the foregoing anticipated magnitude. The result shows that, due to a distribution difference between the first compound and the second compound, both electrochemical stability of the cathode active material and decomposition suppression of the electrolytic solution are achieved.

The foregoing advantageous tendency was similarly obtained in the case where types of the lithium composite oxide, the first compound and the second compound were changed (Examples 2 to 14 and 20 to 25) or in the case where charge voltages were increased (Examples 15, 16, 26, and 27).

In particular, in the case where the cathode active material contained both the first compound and the second compound, if the second compound was a phosphate, a higher capacity retention ratio was obtained. Further, in the case where the lithium composite oxide contained Co as a constituent element, a higher initial capacity was obtained. Further, in the case where a charge voltage was increased, a high initial capacity and a high capacity retention ratio were obtained.

The present application has been described with reference to the embodiment and Examples. However, the present application is not limited to the examples described in the embodiment and Examples, and various modifications may be made. For example, the electrode according to the present application may be applied to other usage such as a capacitor.

Further, for example, the secondary battery according to the present application is similarly applicable to a secondary battery in which the anode capacity includes a capacity by inserting and extracting lithium ions and a capacity associated with precipitation and dissolution of lithium metal, and the battery capacity is expressed by the sum of these capacities. In this case, an anode material capable of inserting and extracting lithium ions is used as an anode active material, and the chargeable capacity of the anode material is set to a smaller value than the discharge capacity of the cathode.

Further, in the embodiment and Examples, the description has been given with the specific examples of the case in which the battery structure is the cylindrical type or the laminated film type, and the battery device has the spirally wound structure. However, applicable structures are not limited thereto. The secondary battery of the present application is similarly applicable to a battery having other battery structures such as a square-type battery, a coin-type battery, and a button-type battery or a battery in which the battery device has other structures such as a laminated structure.

Further, in the embodiment and Examples, the description has been given of the case using lithium as an electrode reactant. However, the electrode reactant is not necessarily limited thereto. As an electrode reactant, for example, other Group 1 element such as sodium (Na) and potassium (K), a Group 2 element such as magnesium and calcium, or other light metals such as aluminum may be used. The effect of the present application may be obtained without depending on the electrode reactant type, and therefore, even if the electrode reactant type is changed, a similar effect is obtainable.

It is possible to achieve at least the following configurations from the above-described exemplary embodiment and the modifications of the disclosure.

(1) A secondary battery including:
a cathode;
an anode; and
an electrolytic solution, wherein
the cathode includes a lithium composite oxide, a first compound, and a second compound,
the lithium composite oxide includes lithium (Li) and a transition metal element as constituent elements,
the first compound includes a first metal element different from the transition metal element as a constituent element, the first compound existing on a surface and inside of the lithium composite oxide, and
the second compound includes a second metal element different from the first metal element as a constituent element, the second compound existing on the surface of the lithium composite oxide.

(2) The secondary battery according to (1), wherein atoms of the first metal element and atoms of the second metal element are not constituent atoms of a crystal lattice of the lithium composite oxide.

(3) The secondary battery according to (1) or (2), wherein the lithium composite oxide includes one or more of nickel (Ni), cobalt (Co), and manganese (Mn) as the transition metal element,
the first compound includes zirconium (Zr) or titanium (Ti) or both as the first metal element, and
the second compound includes one or more of sodium (Na), lithium (Li), magnesium (Mg), zinc (Zn), manganese (Mn), and barium (Ba) as the second metal element.

(4) The secondary battery according to any one of (1) to (3), wherein the second compound includes phosphorus (P) as a constituent element.

(5) The secondary battery according to any one of (1) to (4), wherein the second compound is a phosphate compound.

(6) The secondary battery according to any one of (1) to (5), wherein the lithium composite oxide includes Co as a constituent element.

(7) The secondary battery according to any one of (1) to (6), wherein
the lithium composite oxide is either or both of compounds represented by Formula (1) and Formula (2) described below,
the first compound is a compound represented by Formula (3) described below, and
the second compound is a compound represented by Formula (4) described below, $$Li_a M1_b M2_c O_2 \tag{1}$$

where M1 represents one or more of Ni, Co, and Mn; M2 represents one or more of aluminum (Al), magnesium (Mg), vanadium (V), chromium (Cr), iron (Fe), copper (Cu), zinc (Zn), yttrium (Y), niobium (Nb), molybdenum (Mo), barium (Ba), bismuth (Bi), calcium (Ca), and boron (B); and a to c satisfy $0.01<a<1.3$, $0.9<b<1.05$, and $0\leq c<0.1$, $$Li_d M3_e M4_f O_4 \tag{2}$$

where M3 represents one or more of Ni, Co, and Mn; M4 represents one or more of Al, Mg, V, Cr, Fe, Cu, Zn, Y, Nb, Mo, Ba, Bi, Ca, and B; and d to f satisfy $0.01<d<1.3$, $1.8<e<2.1$, and $0\leq f<0.2$, $$Li_g M5_h O_i \tag{3}$$

where M5 represents Zr or Ti or both; and g to i satisfy $0\leq g\leq 4$, $0<h\leq 5$, and $0<i\leq 12$, $$M6_j P_k O_m F_n \tag{4}$$

where M6 represents one or more of Na, Li, Mg, Zn, Mn, and Ba; and j, k, m, and n satisfy $0<j\leq 6$, $0<k\leq 5$, $0<m\leq 14$, and $0<n\leq 6$.

(8) The secondary battery according to any one of (1) to (7), wherein an upper limit value of a charge voltage is from about 4.2 volts to about 4.8 volts.

(9) The secondary battery according to any one of (1) to (8), wherein an upper limit value of a charge voltage is from about 4.25 volts to about 4.8 volts.

(10) The secondary battery according to any one of (1) to (9), wherein the secondary battery is a lithium ion secondary battery.

(11) An electrode including:
a lithium composite oxide;
a first compound; and
a second compound, wherein
the lithium composite oxide includes lithium (Li) and a transition metal element as constituent elements,
the first compound includes a first metal element different from the transition metal element as a constituent element, the first compound existing on a surface and inside of the lithium composite oxide, and
the second compound includes a second metal element different from the first metal element as a constituent element, the second compound existing on the surface of the lithium composite oxide.

(12) A battery pack including:
the secondary battery according to any one of (1) to (10);
a control section controlling a usage state of the secondary battery; and
a switch section switching the usage state of the secondary battery according to an instruction of the control section, wherein
the secondary battery includes a cathode, an anode, and an electrolytic solution,
the cathode includes a lithium composite oxide, a first compound, and a second compound,
the lithium composite oxide includes lithium (Li) and a transition metal element as constituent elements,
the first compound includes a first metal element different from the transition metal element as a constituent element, the first compound existing on a surface and inside of the lithium composite oxide, and
the second compound includes a second metal element different from the first metal element as a constituent element, the second compound existing on the surface of the lithium composite oxide.

(13) An electric vehicle including:
the secondary battery according to any one of (1) to (10);
a conversion section converting electric power supplied from the secondary battery to drive power;
a drive section operating according to the drive power; and
a control section controlling a usage state of the secondary battery, wherein
the secondary battery includes a cathode, an anode, and an electrolytic solution,
the cathode includes a lithium composite oxide, a first compound, and a second compound,
the lithium composite oxide includes lithium (Li) and a transition metal element as constituent elements,
the first compound includes a first metal element different from the transition metal element as a constituent element, the first compound existing on a surface and inside of the lithium composite oxide, and
the second compound includes a second metal element different from the first metal element as a constituent element, the second compound existing on the surface of the lithium composite oxide.

(14) An electric power storage system including:
the secondary battery according to any one of (1) to (10);
one, or two or more electric devices supplied with electric power from the secondary battery; and
a control section controlling the supplying of the electric power from the secondary battery to the electric device, wherein
the secondary battery includes a cathode, an anode, and an electrolytic solution,
the cathode includes a lithium composite oxide, a first compound, and a second compound,
the lithium composite oxide includes lithium (Li) and a transition metal element as constituent elements,
the first compound includes a first metal element different from the transition metal element as a constituent element, the first compound existing on a surface and inside of the lithium composite oxide, and
the second compound includes a second metal element different from the first metal element as a constituent element, the second compound existing on the surface of the lithium composite oxide.

(15) An electric power tool including:
the secondary battery according to any one of (1) to (10); and
a movable section being supplied with electric power from the secondary battery, wherein
the secondary battery includes a cathode, an anode, and an electrolytic solution,
the cathode includes a lithium composite oxide, a first compound, and a second compound,
the lithium composite oxide includes lithium (Li) and a transition metal element as constituent elements,
the first compound includes a first metal element different from the transition metal element as a constituent element, the first compound existing on a surface and inside of the lithium composite oxide, and
the second compound includes a second metal element different from the first metal element as a constituent element, the second compound existing on the surface of the lithium composite oxide.

(16) An electronic apparatus including the secondary battery according to any one of (1) to (10) as an electric power supply source.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
a cathode;
an anode; and
an electrolytic solution, wherein
the cathode includes particles of a lithium composite oxide, a first compound, and a second compound, the lithium composite oxide includes lithium (Li) and a transition metal element as constituent elements,
the first compound is $Li_4Ti_5O_{12}$, the first compound existing on a surface of and inside of the particles of lithium composite oxide, and
the second compound includes a second metal element different from titanium as a constituent element, the second compound existing on the surface of but not inside of the particles of lithium composite oxide.

2. The secondary battery according to claim 1, wherein titanium atoms of the first compound and atoms of the second metal element are not constituent atoms of a crystal lattice of the lithium composite oxide.

3. The secondary battery according to claim 1, wherein the lithium composite oxide includes one or more of nickel (Ni), cobalt (Co), and manganese (Mn) as the transition metal element, and the second compound includes one or more of sodium (Na), lithium (Li), magnesium (Mg), zinc (Zn), manganese (Mn), and barium (Ba) as the second metal element.

4. The secondary battery according to claim 1, wherein the second compound includes phosphorus (P) as a constituent element.

5. The secondary battery according to claim 1, wherein the second compound is a phosphate compound.

6. The secondary battery according to claim 1, wherein the lithium composite oxide includes Co as a constituent element.

7. The secondary battery according to claim 1, wherein the lithium composite oxide is either or both of compounds represented by Formula (1) and Formula (2) described below, and the second compound is a compound represented by Formula (4) described below, $$Li_a M1_b M2_c O_2 \quad (1)$$

where M1 represents one or more of Ni, Co, and Mn; M2 represents one or more of aluminum (Al), magnesium (Mg), vanadium (V), chromium (Cr), iron (Fe), copper (Cu), zinc (Zn), yttrium (Y), niobium (Nb), molybdenum (Mo), barium (Ba), bismuth (Bi), calcium (Ca), and boron (B); and a to c satisfy $0.01<a<1.3$, $0.9<b<1.05$, and $0 \le c<0.1$, $$Li_d M3_e M4_f O_4 \quad (2)$$

where M3 represents one or more of Ni, Co, and Mn; M4 represents one or more of Al, Mg, V, Cr, Fe, Cu, Zn, Y, Nb, Mo, Ba, Bi, Ca, and B; and d to f satisfy $0.01<d<1.3$, $1.8<e<2.1$, and $0 \le f<0.2$, $$M6_j P_k O_m F_n \quad (4)$$

where M6 represents one or more of Na, Li, Mg, Zn, Mn, and Ba; and j, k, m, and n satisfy $0<j \le 6$, $0<k \le 5$, $0<m \le 14$, and $0<n \le 6$.

8. The secondary battery according to claim 1, wherein an upper limit value of a charge voltage is from about 4.2 volts to about 4.8 volts.

9. The secondary battery according to claim 1, wherein an upper limit value of a charge voltage is from about 4.25 volts to about 4.8 volts.

10. The secondary battery according to claim 1, wherein the secondary battery is a lithium ion secondary battery.

11. An electrode comprising:
particles of a lithium composite oxide;
a first compound; and
a second compound, wherein
the lithium composite oxide includes lithium (Li) and a transition metal element as constituent elements, the first compound is $Li_4Ti_5O_{12}$,
the first compound existing on a surface of and inside of the particles of lithium composite oxide, and
the second compound includes a second metal element different from titanium as a constituent element, the second compound existing on the surface of but not inside of the particles of lithium composite oxide.

12. A battery pack comprising:
a secondary battery;
a control section controlling a usage state of the secondary battery; and
a switch section switching the usage state of the secondary battery according to an instruction of the control section, wherein
the secondary battery includes a cathode, an anode, and an electrolytic solution,
the cathode includes particles of a lithium composite oxide, a first compound, and a second compound,
the lithium composite oxide includes lithium (Li) and a transition metal element as constituent elements,
the first compound is $Li_4Ti_5O_{12}$, the first compound existing on a surface of and inside of the particles of lithium composite oxide, and
the second compound includes a second metal element different from titanium as a constituent element, the second compound existing on the surface of but not inside of the particles of lithium composite oxide.

13. An electric vehicle comprising:
a secondary battery;
a conversion section converting electric power supplied from the secondary battery to drive power;
a drive section operating according to the drive power; and
a control section controlling a usage state of the secondary battery, wherein
the secondary battery includes a cathode, an anode, and an electrolytic solution,
the cathode includes particles of a lithium composite oxide, a first compound, and a second compound,
the lithium composite oxide includes lithium (Li) and a transition metal element as constituent elements,
the first compound is $Li_4Ti_5O_{12}$, the first compound existing on a surface of and inside of the particles of lithium composite oxide, and
the second compound includes a second metal element different from titanium as a constituent element, the second compound existing on the surface of but not inside of the particles of lithium composite oxide.

14. An electric power storage system comprising:
a secondary battery;
one, or two or more electric devices supplied with electric power from the secondary battery; and
a control section controlling the supplying of the electric power from the secondary battery to the electric device, wherein
the secondary battery includes a cathode, an anode, and an electrolytic solution,
the cathode includes particles of a lithium composite oxide, a first compound, and a second compound,
the lithium composite oxide includes lithium (Li) and a transition metal element as constituent elements,
the first compound is $Li_4Ti_5O_{12}$, the first compound existing on a surface of and inside of the particles of lithium composite oxide, and
the second compound includes a second metal element different from titanium as a constituent element, the second compound existing on the surface of but not inside of the particles of lithium composite oxide.

15. An electric power tool comprising:
a secondary battery; and
a movable section being supplied with electric power from the secondary battery, wherein
the secondary battery includes a cathode, an anode, and an electrolytic solution,
the cathode includes particles of a lithium composite oxide, a first compound, and a second compound,
the lithium composite oxide includes lithium (Li) and a transition metal element as constituent elements,
the first compound is $Li_4Ti_5O_{12}$, the first compound existing on a surface of and inside of the particles of lithium composite oxide, and
the second compound includes a second metal element different from titanium as a constituent element, the second compound existing on the surface of but not inside of the particles of lithium composite oxide.

16. An electronic apparatus with a secondary battery as an electric power supply source, the secondary battery comprising:
- a cathode;
- an anode; and
- an electrolytic solution, wherein
- the cathode includes particles of a lithium composite oxide, a first compound, and a second compound,
- the lithium composite oxide includes lithium (Li) and a transition metal element as constituent elements,
- the first compound is $Li_4Ti_5O_{12}$, the first compound existing on a surface of and inside of the particles of lithium composite oxide, and
- the second compound includes a second metal element different from titanium as a constituent element, the second compound existing on the surface of but not inside of the particles of lithium composite oxide.

* * * * *